United States Patent
Hinton

(10) Patent No.: US 9,836,702 B2
(45) Date of Patent: *Dec. 5, 2017

(54) DIGITAL RIGHTS MANAGEMENT (DRM)-ENABLED POLICY MANAGEMENT FOR AN IDENTITY PROVIDER IN A FEDERATED ENVIRONMENT

(75) Inventor: Heather Maria Hinton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/252,404

(22) Filed: Oct. 16, 2008

(65) Prior Publication Data

US 2010/0100925 A1    Apr. 22, 2010

(51) Int. Cl.
*G06Q 10/00* (2012.01)
*G06F 21/10* (2013.01)
*G06F 21/33* (2013.01)
*G06F 21/41* (2013.01)

(52) U.S. Cl.
CPC ............ *G06Q 10/00* (2013.01); *G06F 21/10* (2013.01); *G06F 21/33* (2013.01); *G06F 21/41* (2013.01)

(58) Field of Classification Search
USPC .......................................................... 705/51
See application file for complete search history.

(56) References Cited

U.S. PATENT DOCUMENTS

| | | | |
|---|---|---|---|
| 5,745,879 A * | 4/1998 | Wyman ...................... 705/1.1 |
| 7,346,585 B1 * | 3/2008 | Alabraba et al. ............ 705/59 |
| 7,389,273 B2 * | 6/2008 | Irwin et al. .................. 705/59 |
| 7,555,464 B2 * | 6/2009 | Candelore ................... 705/59 |
| 2004/0111725 A1 * | 6/2004 | Srinivasan et al. .......... 718/105 |
| 2004/0259534 A1 | 12/2004 | Chaudhari et al. |
| 2006/0021018 A1 | 1/2006 | Hinton et al. |
| 2006/0206931 A1 * | 9/2006 | Dillaway et al. ............. 726/9 |
| 2006/0230145 A1 | 10/2006 | Zarakhovsky et al. |
| 2008/0010288 A1 | 1/2008 | Hinton et al. |
| 2008/0010665 A1 | 1/2008 | Hinton et al. |
| 2009/0094679 A1 * | 4/2009 | Canning et al. .............. 726/3 |
| 2010/0023962 A1 * | 1/2010 | Blommaert et al. .......... 725/31 |
| 2010/0100899 A1 * | 4/2010 | Bradbury et al. ............ 725/29 |

* cited by examiner

*Primary Examiner* — John Hayes
*Assistant Examiner* — John M Winter
(74) *Attorney, Agent, or Firm* — Richard A. Wilhelm; David H. Judson; Jeffrey S. LaBaw

(57) ABSTRACT

A method operative at an identity provider enforces a digital rights management (DRM) scheme associated with a piece of content. The identity provider is an entity that participates in a "federation" with one or more other entities including, for example, an service provider (e.g., a content provider), a DRM privileges provider, and a DRM policy provider. In one embodiment, the method begins by having the identity provider obtain and evaluate against a DRM policy a set of DRM privileges associated with the end user requesting access to the piece of content. Based on the evaluation, the identity provider generates a single sign on (SSO) message that includes a reference to the set of DRM privileges. The message is then forward to the service provider entity, which provides the end user a response.

15 Claims, 9 Drawing Sheets

DIGITAL RIGHTS MANAGEMENT (DRM)-ENABLED POLICY MANAGEMENT FOR AN IDENTITY PROVIDER IN A FEDERATED ENVIRONMENT

BACKGROUND OF THE INVENTION

Technical Field

The present invention relates generally to management of user sessions in a federated environment.

Background of the Related Art

Federated environments are well known in the art. U.S. Publication No. 2006/0021018, filed Jul. 21, 2004, is representative. A federation is a set of distinct entities, such as enterprises, organizations, institutions, or the like, that cooperate to provide a single-sign-on, ease-of-use experience to a user; a federated environment differs from a typical single-sign-on environment in that two enterprises need not have a direct, pre-established, relationship defining how and what information to transfer about a user. Within a federated environment, entities provide services that deal with authenticating users, accepting authentication assertions (e.g., authentication tokens) that are presented by other entities, and providing some form of translation of the identity of the vouched-for user into one that is understood within the local entity. Federation eases the administrative burden on service providers. A service provider can rely on its trust relationships with respect to the federation as a whole; the service provider does not need to manage authentication information, such as user password information, because it can rely on authentication that is accomplished by a user's authentication home domain or an identity provider.

A federated entity may act as a user's home domain, which provides identity information and attribute information about federated users. An entity within a federated computing environment that provides identity information, identity or authentication assertions, or identity services is termed an identity provider. Other entities or federation partners within the same federation may rely on an identity provider for primary management of a user's authentication credentials, e.g., accepting a single-sign-on token that is provided by the user's identity provider; a domain at which the user authenticates may be termed the user's (authentication) home domain. An identity provider is a specific type of service that provides identity information as a service to other entities within a federated computing environment. With respect to most federated transactions, an issuing party for an authentication assertion would usually be an identity provider; any other entity can be distinguished from the identity provider. Any other entity that provides a service within the federated computing environment can be categorized as a service provider. Once a user has authenticated to the identity provider, other entities or enterprises in the federation may be regarded as merely service providers for the duration of a given federated session or a given federated transaction.

Digital rights management (DRM) is a well-known technology for securing digital content. DRM works by encrypting content before distribution, and by limiting access to only those end-users who have acquired a proper license to play the content. Typically, the DRM license enforcement is done at the player/client. A complete DRM system typically comprises several parts: encryption, business-logic and license-delivery. DRM starts by encrypting the content. Once the content is encrypted, a key is required to unlock (decrypt) the content. The encrypted content can be delivered to the end user through well-known delivery methods. Typically, an end-user who desires to obtain the content visits an e-commerce web site and transacts with the business-logic process, usually involving one of registration, login, and/or payment; once this is done, the end-user is issued a license to play the content. The issued license typically comprises (i) a key (for decrypting the content), (ii) a set of rights (e.g. play exactly once, play for 30 days, or the like), and (iii) with the property that the license is valid only on the end-user machine to which it is issued. When an end-user attempts to play the DRM-protected content, the player first checks to see whether the license exists on the local machine; if so, the playback starts by decrypting the content. If a license is not found, the player attempts to get a license, typically from the storefront URL that is embedded in the content.

BRIEF SUMMARY

A method operative at an identity provider enforces a digital rights management (DRM) scheme associated with a piece of content. The service provider typically is a content provider. The identity provider is an entity that participates in a "federation" with one or more other entities including, for example, a service provider (such as a content provider), a DRM privileges provider, and a DRM policy provider. In one embodiment, the method begins by having the identity provider obtain and evaluate against a DRM policy a set of DRM privileges associated with the end user requesting access to the piece of content. Based on the evaluation, the identity provider generates a single sign on (SSO) message that includes a reference to the set of DRM privileges. The message is then forward to the service provider entity, which provides the end user a response.

The identity provider, service provider, DRM privileges provider and DRM policy provider functions facilitate a DRM policy-enabled federation. One or more of the functions of the DRM privileges provider and DRM policy provider may be integrated with the identity provider and/or the service provider.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1A:
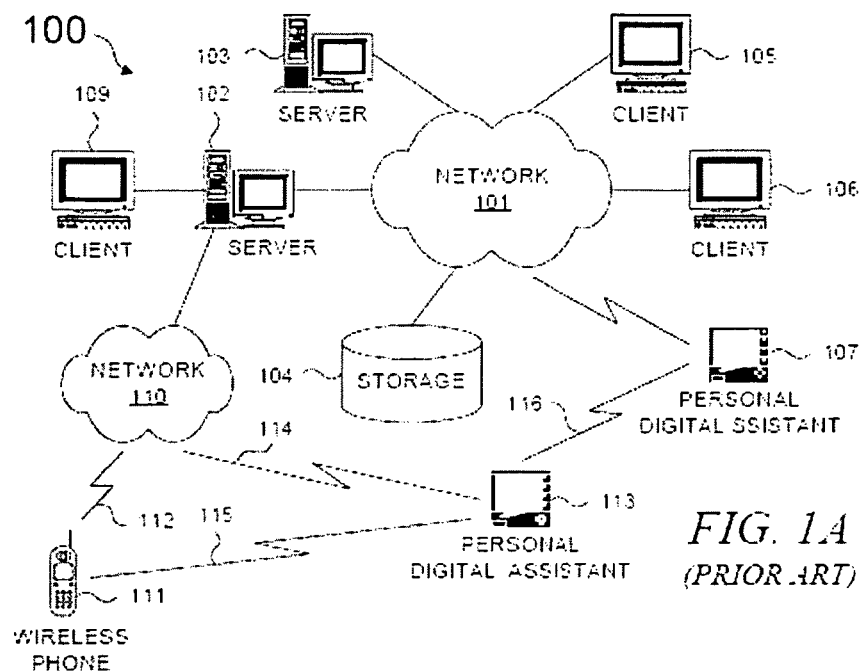
FIG. 1A depicts a typical network of data processing systems, each of which may implement the subject matter described herein.

With reference now to the figures, FIG. 1A depicts a typical network of data processing systems, each of which may implement the subject matter disclosed herein. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as LDAP (Lightweight Directory Access Protocol), TCP/IP (Transport Control Protocol/Internet Protocol), HTTP (HyperText Transport Protocol), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks or personal ad-hoc networks. In a similar manner, PDA 113 can transfer data to PDA 107 via wireless communication link 116.

The subject matter herein could be implemented on a variety of hardware platforms and software environments. FIG. 1A is intended as an example of a heterogeneous computing environment and not as an architectural limitation for the present invention.

Figure 1B:
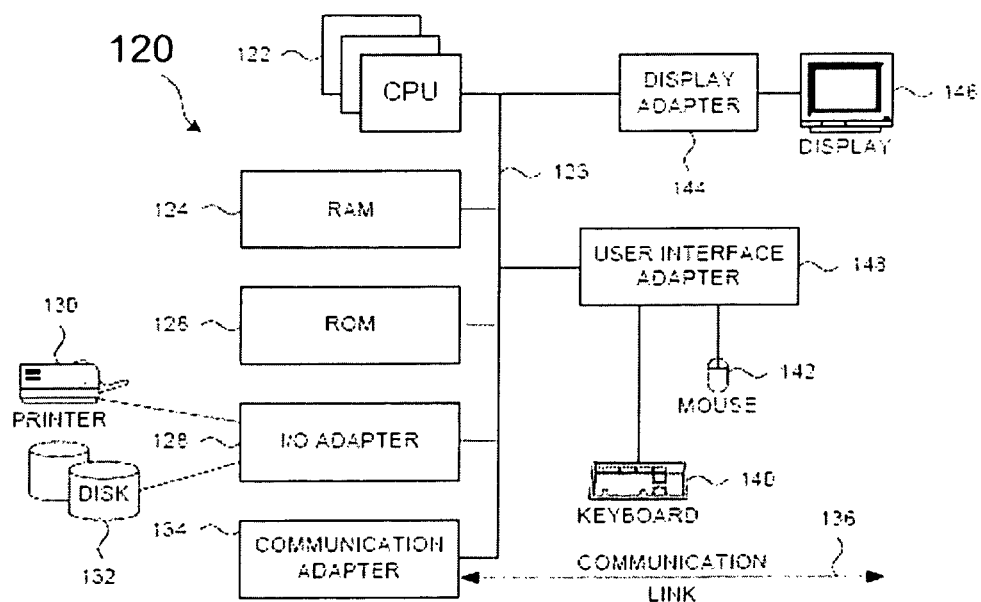
FIG. 1B depicts a typical computer architecture that may be used within a data processing system in which the disclosed subject matter may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files. It should also be noted that the distributed data processing system shown in FIG. 1A is contemplated as being fully able to support a variety of peer-to-peer subnets and peer-to-peer services.

Given the preceding brief description of some current technology, the description of the remaining figures relates to federated computer environments in which the present invention may operate. Prior to discussing the present invention in more detail, however, some terminology is introduced.

As used herein, the terms "entity" or "party" generally refers to an organization, an individual, or a system that operates on behalf of an organization, an individual, or another system. The term "domain" connotes additional characteristics within a network environment, but the terms "entity", "party", and "domain" can be used interchangeably. For example, the term "domain" may also refer to a DNS (Domain Name System) domain, or more generally, to a data processing system that includes various devices and applications that appear as a logical unit to exterior entities.

The terms "request" and "response" should be understood to comprise data formatting that is appropriate for the transfer of information that is involved in a particular operation, such as messages, communication protocol information, or other associated information. A protected resource is a resource (an application, an object, a document, a page, a file, executable code, or other computational resource, communication-type resource, etc.) for which access is controlled or restricted.

A token provides direct evidence of a successful operation and is produced by the entity that performs the operation, e.g., an authentication token that is generated after a successful authentication operation. A Kerberos token is one example of an authentication token that may be used with the present invention. More information on Kerberos may be found in Kohl et al., "The Kerberos Network Authentication Service (V5)", Internet Engineering Task Force (IETF) Request for Comments (RFC) 1510, 09/1993.

An assertion provides indirect evidence of some action. Assertions may provide indirect evidence of identity, authentication, attributes, authorization decisions, or other information and/or operations. An authentication assertion provides indirect evidence of authentication by an entity that is not the authentication service but that listened to the authentication service.

A Security Assertion Markup Language (SAML) assertion is an example of a possible assertion format that may be used with the present invention. SAML has been promulgated by the Organization for the Advancement of Structured Information Standards (OASIS), which is a non-profit, global consortium. SAML is described in "Assertions and Protocol for the OASIS Security Assertion Markup Language (SAML)", Committee Specification 01, May 31, 2002, as follows:

> The Security Assertion Markup Language (SAML) is an XML-based framework for exchanging security information. This security information is expressed in the form of assertions about subjects, where a subject is an entity (either human or computer) that has an identity in some security domain. A typical example of a subject is a person, identified by his or her email address in a particular Internet DNS domain. Assertions can convey information about authentication acts performed by subjects, attributes of subjects, and authorization decisions about whether subjects are allowed to access certain resources. Assertions are represented as XML constructs and have a nested structure, whereby a single assertion might contain several different internal statements about authentication, authorization, and attributes. Note that assertions containing authentication statements merely describe acts of authentication that happened previously. Assertions are issued by SAML authorities, namely, authentication authorities, attribute authorities, and policy decision points. SAML defines a protocol by which clients can request assertions from SAML authorities and get a response from them. This protocol, consisting of XML-based request and response message formats, can be bound to many different underlying communications and transport protocols; SAML currently defines one binding, to SOAP over HTTP. SAML authorities can use various sources of information, such as external policy stores and assertions that were received as input in requests, in creating their responses. Thus, while clients always consume assertions, SAML authorities can be both producers and consumers of assertions.

The SAML specification states that an assertion is a package of information that supplies one or more statements made by an issuer. SAML allows issuers to make three different kinds of assertion statements: authentication, in which the specified subject was authenticated by a particular means at a particular time; authorization, in which a request to allow the specified subject to access the specified resource has been granted or denied; and attribute, in which the specified subject is associated with the supplied attributes. As discussed further below, various assertion formats can be translated to other assertion formats when necessary.

Authentication is the process of validating a set of credentials that are provided by a user or on behalf of a user. Authentication is accomplished by verifying something that a user knows, something that a user has, or something that the user is, i.e. some physical characteristic about the user. Something that a user knows may include a shared secret, such as a user's password, or by verifying something that is known only to a particular user, such as a user's cryptographic key. Something that a user has may include a smartcard or hardware token. Some physical characteristic about the user might include a biometric input, such as a fingerprint or a retinal map. It should be noted that a user is typically but not necessarily a natural person; a user could be a machine, computing device, or other type of data processing system that uses a computational resource. It should also be noted that a user typically but not necessarily possesses a single unique identifier; in some scenarios, multiple unique identifiers may be associated with a single user.

An authentication credential is a set of challenge/response information that is used in various authentication protocols. For example, a username and password combination is the most familiar form of authentication credentials. Other forms of authentication credential may include various forms of challenge/response information, Public Key Infrastructure (PKI) certificates, smartcards, biometrics, and so forth. An authentication credential is differentiated from an authentication assertion: an authentication credential is presented by a user as part of an authentication protocol sequence with an authentication server or service, and an authentication assertion is a statement about the successful presentation and validation of a user's authentication credentials, subsequently transferred between entities when necessary.

In the context of the World Wide Web, users are coming to expect the ability to jump from interacting with an application on one Internet domain to another application on another domain with minimal regard to the information barriers between each particular domain. Users do not want the frustration that is caused by having to authenticate to multiple domains for a single transaction. In other words, users expect that organizations should intemperate, but users generally want domains to respect their privacy. In addition, users may prefer to limit the domains that permanently store private information. These user expectations exist in a rapidly evolving heterogeneous environment in which many enterprises and organizations are promulgating competing authentication techniques.

The subject matter herein is supported within a federation model that allows enterprises to provide a single-sign-on experience to a user. In other words, the present invention may be implemented within a federated, heterogeneous environment. As an example of a transaction that would benefit from a federated, heterogeneous environment, a user is able to authenticate to a domain and then have the domain provide the appropriate assertions to each downstream domain that might be involved in a transaction. These downstream domains need to be able to understand and trust authentication assertions and/or other types of assertions, even though there are no pre-established assertion formats between the domain and these other downstream domains. In addition to recognizing the assertions, the downstream domains need to be able to translate the identity contained within an assertion to an identity that represents the user within a particular domain, even though there is no pre-established identity mapping relationship.

The subject matter herein is supported within a federated environment. In general, an enterprise has its own user registry and maintains relationships with its own set of users. Each enterprise typically has its own means of authenticating these users. However, the federated scheme for use with the present invention allows enterprises to cooperate in a collective manner such that users in one enterprise can leverage relationships with a set of enterprises through an enterprise's participation in a federation of enterprises. Users can be granted access to resources at any of the federated enterprises as if they had a direct relationship with each enterprise. Users are not required to register at each business of interest, and users are not constantly required to identify and authenticate themselves. Hence, within this federated environment, an authentication scheme allows for a single-sign-on experience within the rapidly evolving heterogeneous environments in information technology.

In the context of the present invention, a federation is a set of distinct entities, such as enterprises, logical units within an enterprise, organizations, institutions, etc., that cooperate to provide a single-sign-on, ease-of-use experience to a user; a federated environment differs from a typical single-sign-on environment in that two enterprises need not have a direct, pre-established, relationship defining how and what information to transfer about a user. Within a federated environment, entities provide services which deal with authenticating users, accepting authentication assertions, e.g., authentication tokens, that are presented by other entities, and providing some form of translation of the identity of the vouched-for user into one that is understood within the local entity.

Federation eases the administrative burden on service providers. A service provider can rely on its trust relationships with respect to the federation as a whole; the service provider does not need to manage authentication information, such as user password information, because it can rely on authentication that is accomplished by a user's authentication home domain or an identity provider.

The system that supports the present invention also concerns a federated identity management system that establishes a foundation in which loosely coupled authentication, user enrollment, user profile management and/or authorization services collaborate across security domains. Federated identity management allows services residing in disparate security domains to securely interoperate and collaborate even though there may be differences in the underlying security mechanisms and operating system platforms at these disparate domains.

As mentioned above and as explained in more detail further below, a federated environment provides significant user benefits. A federated environment allows a user to authenticate at a first entity, which may act as an issuing party to issue an authentication assertion about the user for use at a second entity. The user can then access protected resources at a second, distinct entity, termed the relying party, by presenting the authentication assertion that was issued by the first entity without having to explicitly re-authenticate at the second entity. Information that is passed from an issuing party to a relying party is in the form of an assertion, and this assertion may contain different types of information in the form of statements. For example, an assertion may be a statement about the authenticated identity of a user, or it may be a statement about user attribute information that is associated with a particular user. Furthermore, this information can be used by a relying party to provide access to the relying party's resources, based on the relying party's access control rules, identity mapping rules, and possibly some user attributes that are maintained by the relying party.

Figure 2:
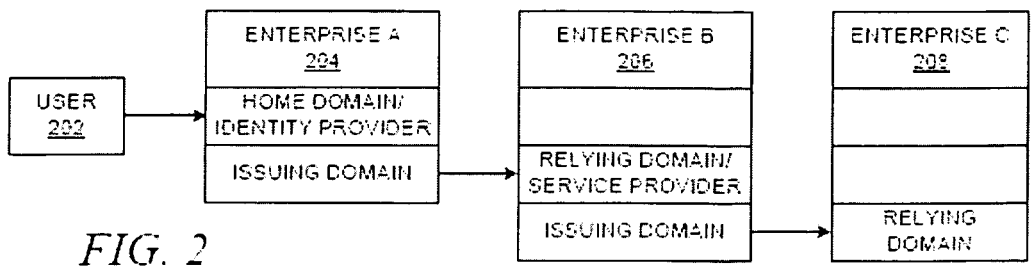
FIG. 2 depicts a block diagram that illustrates the terminology of a federated environment.

With reference now to FIG. 2, a block diagram depicts the terminology of the federated environment with respect to a transaction that is initiated by a user to a first federated enterprise, which, in response, invokes actions at downstream entities within the federated environment. FIG. 2 shows that the terminology may differ depending on the perspective of an entity within the federation for a given federated operation. More specifically, FIG. 2 illustrates that a computing environment that supports the present invention supports the transitivity of trust and the transitivity of the authentication assertion process; a domain or an entity can issue an assertion based on its trust in an identity as asserted by another domain or another entity.

User 202 initiates a transaction through a request for a protected resource at enterprise 204. If user 202 has been authenticated by enterprise 204 or will eventually be authenticated by enterprise 204 during the course of a transaction, then enterprise 204 may be termed the user's home domain for this federated session. Assuming that the transaction requires some type of operation by enterprise 206 and enterprise 204 transfers an assertion to enterprise 206, then enterprise 204 is the issuing entity with respect to the particular operation, and enterprise 206 is the relying entity for the operation.

The issuing entity issues an assertion for use by the relying domain; an issuing entity is usually, but not necessarily, the user's home domain or the user's identity provider. Hence, it would usually be the case that the issuing party has authenticated the user using a typical authentication operation. However, it is possible that the issuing party has previously acted as a relying party whereby it received an assertion from a different issuing party. In other words, since a user-initiated transaction may cascade through a series of enterprises within a federated environment, a receiving party may subsequently act as an issuing party for a downstream transaction. In general, any entity that has the ability to issue authentication assertions on behalf of a user can act as an issuing entity.

The relying entity is an entity that receives an assertion from an issuing entity. The relying party is able to accept, trust, and understand an assertion that is issued by a third party on behalf of the user, i.e. the issuing entity; it is generally the relying entity's duty to use an appropriate authentication authority to interpret an authentication assertion. A relying party is an entity that relies on an assertion that is presented on behalf of a user or another entity. In this manner, a user can be given a single-sign-on experience at the relying entity instead of requiring the relying entity to prompt the user for the user's authentication credentials as part of an interactive session with the user.

Referring again to FIG. 2, assuming that the transaction requires further operations such that enterprise 206 transfers an assertion to enterprise 208, then enterprise 206 is an upstream entity that acts as the issuing entity with respect to the subsequent or secondary transaction operation, and enterprise 208 is a downstream entity that acts as the relying entity for the operation; in this case, enterprise 208 may be regarded as another downstream entity with respect to the original transaction, although the subsequent transaction can also be described with respect to only two entities.

As shown in FIG. 2, a federated entity may act as a user's home domain, which provides identity information and attribute information about federated users. An entity within a federated computing environment that provides identity information, identity or authentication assertions, or identity services may be termed an identity provider. Other entities or federation partners within the same federation may rely on an identity provider for primary management of a user's authentication credentials, e.g., accepting a single-sign-on token that is provided by the user's identity provider; a domain at which the user authenticates may be termed the user's (authentication) home domain. The identity provider may be physically supported by the user's employer, the user's ISP, or some other commercial entity.

An identity provider is a specific type of service that provides identity information as a service to other entities within a federated computing environment. With respect to most federated transactions, an issuing party for an authentication assertion would usually be an identity provider; any other entity can be distinguished from the identity provider. Any other entity that provides a service within the federated computing environment can be categorized as a service provider. Once a user has authenticated to the identity provider, other entities or enterprises in the federation may be regarded as merely service providers for the duration of a given federated session or a given federated transaction.

In some circumstances, there may be multiple entities within a federated environment that may act as identity providers for a user. For example, the user may have accounts at multiple federated domains, each of which is able to act as an identity provider for the user; these domains do not necessarily have information about the other domains nor about a user's identity at a different domain.

Although it may be possible that there could be multiple enterprises within a federated environment that may act as identity providers, e.g., because there may be multiple enterprises that have the ability to generate and validate a user's authentication credentials, etc., a federated transaction usually involves only a single identity provider. If there is only a single federated entity that is able to authenticate a user, e.g., because there is one and only one entity within the federation with which the user has performed a federated enrollment or registration operation, then it would be expected that this entity would act as the user's identity provider in order to support the user's transactions throughout the federated environment.

Within some federated transactions that require the interoperation of multiple service providers, a downstream service provider may accept an assertion from an upstream service provider; the conditions in which an upstream service provider may act as an issuing entity to a downstream service provider that is acting as a relying party may depend upon the type of trust relationship between the service providers and the type of transaction between the service providers. Within the scope of a simple federated transaction, however, there is only one entity that acts as an issuing entity.

The present invention may be supported within a given computing environment in which a federated infrastructure can be added to existing systems while minimizing the impact on an existing, non-federated architecture. Hence, operations, including authentication operations, at any given enterprise or service provider are not necessarily altered by the fact that an entity may also participate within a federated environment. In other words, even though an entity's computing systems may be integrated into a federated environment, a user may be able to continue to perform various operations, including authentication operations, directly with an enterprise in a non-federated manner. However, the user may be able to have the same end-user experience while performing a federated operation with respect to a given entity as if the user had performed a similar operation with the given entity in a non-federated manner. Hence, it should be noted that not all of a given enterprise's users necessarily participate federated transactions when the given enterprise participates in a federation; some of the enterprise's users may interact with the enterprise's computing systems without performing any federated transactions.

Moreover, user registration within the computing environment of a given enterprise, e.g., establishment of a user account in a computer system, is not necessarily altered by the fact that the enterprise may also participate within a federated environment. For example, a user may still establish an account at a domain through a legacy or pre-existing registration process that is independent of a federated environment. Hence, in some cases, the establishment of a user account at an enterprise may or may not include the establishment of account information that is valid across a federation when the enterprise participates within a federated computing environment.

Figure 3:
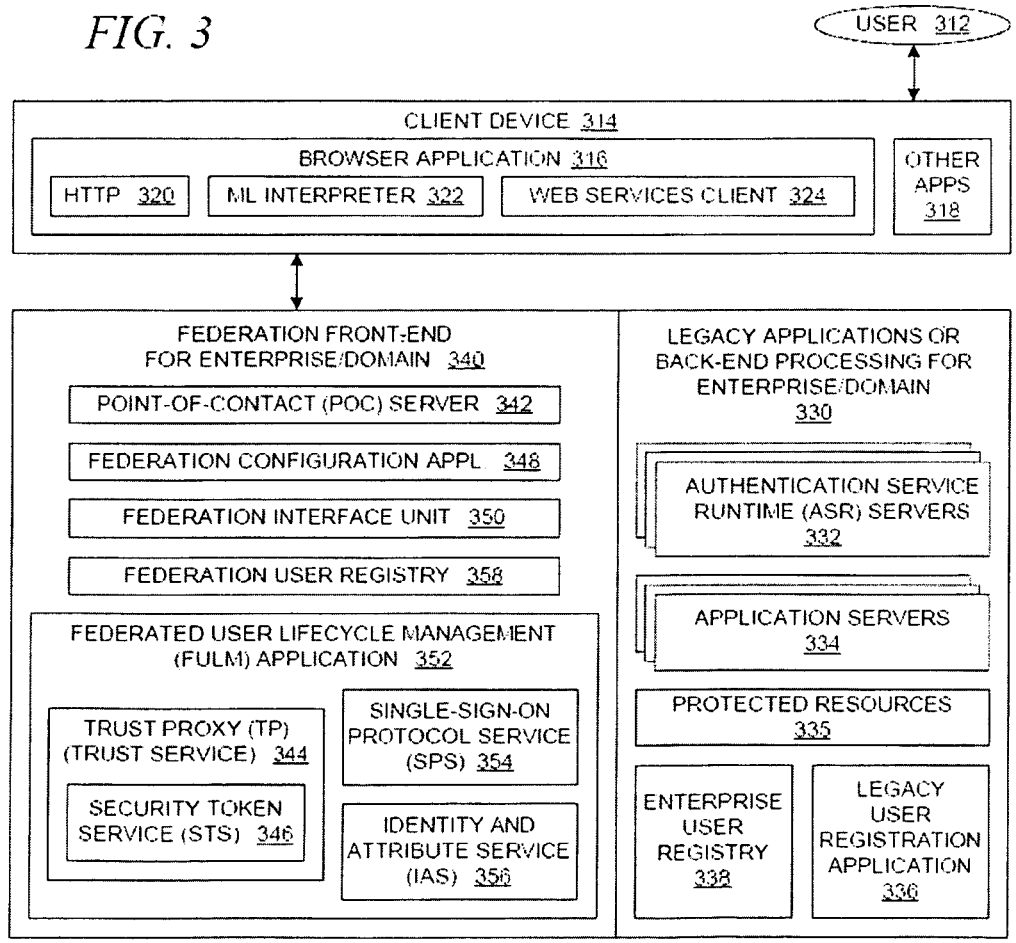
FIG. 3 depicts a block diagram that illustrates the integration of pre-existing data processing systems at a given domain with some federated architecture components that may be used to support an embodiment of the described subject matter.

With reference now to FIG. 3, a block diagram depicts the integration of pre-existing data processing systems at a given domain with some federated architecture components that may be used to support an embodiment of the present invention. A federated environment includes federated entities that provide a variety of services for users. User 312 interacts with client device 314, which may support browser application 316 and various other client applications 318. User 312 is distinct from client device 314, browser 316, or any other software that acts as interface between user and other devices and services. In some cases, the following description may make a distinction between the user acting explicitly within a client application and a client application that is acting on behalf of the user. In general, though, a requester is an intermediary, such as a client-based application, browser, SOAP client, etc., that may be assumed to act on behalf of the user.

Browser application 316 may be a typical browser, including those found on mobile devices, that comprises many modules, such as HTTP communication component 320 and markup language (ML) interpreter 322. Browser application 316 may also support plug-ins, such as web services client 324, and/or downloadable applets, which may or may not require a virtual machine runtime environment. Web services client 324 may use Simple Object Access Protocol (SOAP), which is a lightweight protocol for defining the exchange of structured and typed information in a decentralized, distributed environment. SOAP is an XML-based protocol that consists of three parts: an envelope that defines a framework for describing what is in a message and how to process it; a set of encoding rules for expressing instances of application-defined datatypes; and a convention for representing remote procedure calls and responses. User 312 may access web-based services using browser application 316, but user 312 may also access web services through other web service clients on client device 314. Some of the federated operations may employ HTTP redirection via the user's browser to exchange information between entities in a federated environment. However, it should be noted that the present invention may be supported over a variety of communication protocols and is not meant to be limited to HTTP-based communications. For example, the entities in the federated environment may communicate directly when necessary; messages are not required to be redirected through the user's browser.

The subject matter herein may be supported in a manner such that components that are required for a federated environment can be integrated with pre-existing systems. FIG. 3 depicts one embodiment for implementing these components as a front-end to a pre-existing system. The pre-existing components at a federated domain can be considered as legacy applications or back-end processing components 330, which include authentication service runtime (ASR) servers 332 in a manner similar to that shown in FIG. 4. ASR servers 332 are responsible for authenticating users when the domain controls access to application servers 334, which can be considered to generate, retrieve, or otherwise support or process protected resources 335. The domain may continue to use legacy user registration application 336 to register users for access to application servers 334. Information that is needed to authenticate a registered user with respect to legacy operations is stored in enterprise user registry 338; enterprise user registry 338 may be accessible to federation components as well.

After joining a federated environment, the domain may continue to operate without the intervention of federated components. In other words, the domain may be configured so that users may continue to access particular application servers or other protected resources directly without going through a point-of-contact server or other component implementing this point-of-contact server functionality; a user that accesses a system in this manner would experience typical authentication flows and typical access. In doing so, however, a user that directly accesses the legacy system would not be able to establish a federated session that is known to the domain's point-of-contact server.

The domain's legacy functionality can be integrated into a federated environment through the use of federation front-end processing 340, which includes point-of-contact server 342 and trust proxy server 344 (or more simply, trust proxy 344 or trust service 344) which itself interacts with Security Token Service (STS) 346, which are described in more detail below with respect to FIG. 4. Federation configuration application 348 allows an administrative user to configure the federation front-end components to allow them to interface with the legacy back-end components through federation interface unit 350. Federated functionality may be implemented in distinct system components or modules. In a preferred embodiment, most of the functionality for performing federation operations may be implemented by a collection of logical components within a single federation application; federated user lifecycle management application 352 includes trust service 344 along with single-sip-on protocol service (SPS) 354. Trust service 344 may comprise identity-and-attribute service (IAS) 356, which is responsible for identity mapping operations, attribute retrieval, etc., as part of federation functionality. Identity-and-attribute service 356 may also be employed by single-sign-on protocol service 354 during single-sign-on operations. A federation user registry 358 may be employed in certain circumstances to maintain user-related information for federation-specific purposes.

Legacy or pre-existing authentication services at a given enterprise may use various, well known, authentication methods or tokens, such as username/password or smart card token-based information. However, in a preferred federated computing system for supporting the present invention, the functionality of a legacy authentication service can be used in a federated environment through the use of point-of-contact servers. Users may continue to access a legacy authentication server directly without going through a point-of-contact server, although a user that accesses a system in this manner would experience typical authentication flows and typical access; a user that directly accesses a legacy authentication system would not be able to generate a federated authentication assertion as proof of identity in accordance with the present invention. One of the roles of the federation front-end is to translate a federated authentication token received at a point-of-contact server into a format understood by a legacy authentication service. Hence, a user accessing the federated environment via the point-of-contact server would not necessarily be required to re-authenticate to the legacy authentication service. Preferably, the user would be authenticated to a legacy authentication service by a combination of the point-of-contact server and a trust proxy such that it appears as if the user was engaged in an authentication dialog.

Figure 4:
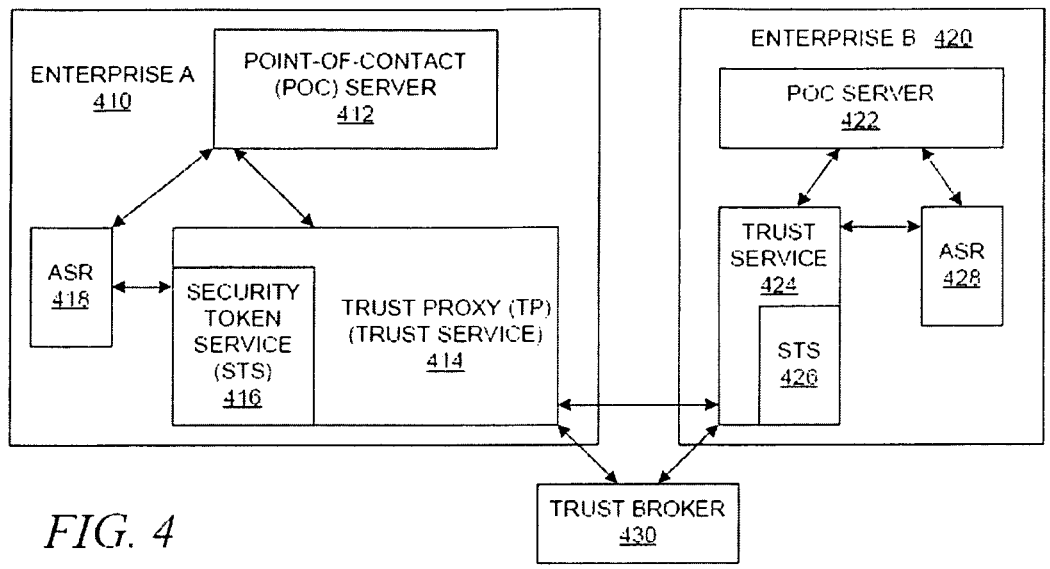
FIG. 4 depicts a block diagram that illustrates an example of a manner in which some components within a federated architecture may be used to establish trust relationships to support an implementation of the described subject matter.

With reference now to FIG. 4, a block diagram depicts an example of a manner in which some components within a federated architecture may be used to establish trust relationships. A federated environment includes federated enterprises or similar entities that provide a variety of services for users. A user, through an application on a client device, may attempt to access resources at various entities, such as enterprise 410. A point-of-contact server at each federated enterprise, such as point-of-contact (POC) server 412 at enterprise 410, is the entry point into the federated environment for requests from a client to access resources that are supported and made available by enterprise 410. The point-of-contact server minimizes the impact on existing components within an existing, non-federated architecture, e.g., legacy systems, because the point-of-contact server handles many of the federation requirements. The point-of-contact server provides session management, protocol conversion, and possibly initiates authentication and/or attribute assertion conversion. For example, the point-of-contact server may translate HTTP or HTTPS messages to SOAP and vice versa. As explained in more detail further below, the point-of-contact server may also be used to invoke a trust proxy to translate assertions, e.g., a SAML token received from an issuing party can be translated into a Kerberos token understood by a receiving party.

A trust service (also termed a trust proxy, a trust proxy server, or a trust service), such as trust proxy (TP) 414 at enterprise 410, establishes and maintains a trust relationship between two entities in a federation. A trust service generally has the ability to handle authentication token format translation (through the security token service, which is described in more detail further below) from a format used by the issuing party to one understood by the receiving party.

Together, the use of a point-of-contact server and a trust service minimize the impact of implementing a federated architecture on an existing, non-federated set of systems. Hence, the exemplary federated architecture requires the implementation of at least one point-of-contact server and at least one trust service per federated entity, whether the entity is an enterprise, a domain, or other logical or physical entity. The exemplary federated architecture, though, does not necessarily require any changes to the existing, non-federated set of systems. Preferably, there is a single trust service for a given federated entity, although there may be multiple instances of a trust service component for availability purposes, or there may be multiple trust services for a variety of smaller entities within a federated entity, e.g., separate subsidiaries within an enterprise. It is possible that a given entity could belong to more than one federation, although this scenario would not necessarily require multiple trust services as a single trust service may be able to manage trust relationships within multiple federations.

One role of a trust service may be to determine or to be responsible for determining the required token type by another domain and/or the trust service in that domain. A trust service has the ability or the responsibility to handle authentication token format translation from a format used by the issuing party to one understood by the receiving party. Trust service 414 may also be responsible for any user identity translation or attribute translation that occurs for enterprise 410, or this responsibility may be supported by a distinct identity-and-attribute service, e.g., such as identity-and-attribute service 356 as shown in FIG. 3. In addition, a trust service can support the implementation of aliases as representatives of a user identity that uniquely identify a user without providing any addition information about the user's real world identity. Furthermore, a trust proxy can issue authorization and/or session credentials for use by the point-of-contact server. However, a trust service may invoke a trust broker for assistance, as described further below. Identity translation may be required to map a user's identity and attributes as known to an issuing party to one that is meaningful to a receiving party. This translation may be invoked by either a trust service at an issuing entity, a trust service at a receiving entity, or both.

Trust service 414, or a distinct identity-and-attribute service as mentioned above, may include (or interact with) an internalized component, shown as security token service (STS) component 416, which will provide token translation and will invoke authentication service runtime (ASR) 418 to validate and generate tokens. The security token service provides the token issuance and validation services required by the trust service, which may include identity translation. The security token service therefore includes an interface to existing authentication service runtimes, or it incorporates authentication service runtimes into the service itself. Rather than being internalized within the trust service, the security token service component may also be implemented as a stand-alone component, e.g., to be invoked by the trust service, or it may be internalized within a transaction server, e.g., as part of an application server.

For example, a security token service component may receive a request to issue a Kerberos token. As part of the authentication information of the user for whom the token is to be created, the request may contain a binary token containing a username and password. The security token service component will validate the username and password against, e.g., an LDAP runtime (typical authentication) and will invoke a Kerberos KDC (Key Distribution Center) to generate a Kerberos ticket for this user. This token is returned to the trust service for use within the enterprise; however, this use may include externalizing the token for transfer to another domain in the federation.

A user may desire to access resources at multiple enterprises within a federated environment, such as both enterprise 410 and enterprise 420. In a manner similar to that described above for enterprise 410, enterprise 420 comprises point-of-contact server 422, trust service 424, security token service (STS) 426, and authentication service runtime 428. Although the user may directly initiate separate transactions with each enterprise, the user may initiate a transaction with enterprise 410 which cascades throughout the federated environment. Enterprise 410 may require collaboration with multiple other enterprises within the federated environment, such as enterprise 420, to complete a particular transaction, even though the user may not have been aware of this necessity when the user initiated a transaction. Enterprise 420 becomes involved as a downstream entity, and enterprise 410 may present an assertion to enterprise 420 if necessary to further the user's federated transaction.

It may be the case that a trust service does not know how to interpret the authentication token that is received by an associated point-of-contact server and/or how to translate a given user identity and attributes. In this case, the trust service may choose to invoke functionality at a trust broker component, such as trust broker 430. A trust broker maintains relationships with individual trust proxies/services, thereby providing transitive trust between trust services. Using a trust broker allows each entity within a federated environment, such enterprises 410 and 420, to establish a trust relationship with the trust broker rather than establishing multiple individual trust relationships with each entity in the federated environment. For example, when enterprise 420 becomes involved as a downstream entity for a transaction initiated by a user at enterprise 410, trust service 414 at enterprise 410 can be assured that trust service 424 at enterprise 420 can understand an assertion from trust service 414 by invoking assistance at trust broker 430 if necessary. Although FIG. 4 depicts the federated environment with a single trust broker, a federated environment may have multiple trust brokers.

It should be noted that although FIG. 4 depicts point-of-contact server 412, trust service 414, security token service component 416, and authentication service runtime 418 as distinct entities, it is not necessary for these components to be implemented on separate components. For example, it is possible for the functionality of these separate components to be implemented as a single application, as applications on a single physical device, or as distributed applications on multiple physical devices. In addition, FIG. 4 depicts a single point-of-contact server, a single trust service, and a single security token server for an enterprise, but an alternative configuration may include multiple point-of-contact servers, multiple trust services, and multiple security token servers for each enterprise. The point-of-contact server, the trust service, the security token service, and other federated entities may be implemented in various forms, such as software applications, objects, modules, software libraries, and the like.

A trust service/STS may be capable of accepting and validating many different authentication credentials, including traditional credentials such as a username and password combinations and Kerberos tickets, and federated authentication token formats, including authentication tokens produced by a third party. A trust service/STS may allow the acceptance of an authentication token as proof of authentication elsewhere. The authentication token is produced by an issuing party and is used to indicate that a user has already authenticated to that issuing party. The issuing party produces the authentication token as a means of asserting the authenticated identity of a user. A trust service/STS is also able to process attribute tokens or tokens that are used to secure communication sessions or conversations, e.g., those that are used to manage session information in a manner similar to an SSL session identifier.

A security token service invokes an authentication service runtime as necessary. The authentication service runtime supports an authentication service capable of authenticating a user. The authentication service acts as an authentication authority that provides indications of successful or failed authentication attempts via authentication responses. The trust service/STS may internalize an authentication service, e.g., a scenario in which there is a brand-new installation of a web service that does not need to interact with an existing legacy infrastructure. Otherwise, the security token service component will invoke external authentication services for validation of authentication tokens. For example, the security token service component could "unpack" a token containing a username/password and then use an LDAP service to access a user registry to validate the presented credentials.

When used by another component such as an application server, the security token service component can be used to produce tokens required for single-sign-on to legacy authentication systems; this functionality may be combined with or replaced by functionality within a single-sign-on protocol service, such as SPS 354 that is shown in FIG. 3. Hence, the security token service component can be used for token translation for internal purposes, i.e. within an enterprise, and for external purposes, i.e. across enterprises in a federation. As an example of an internal purpose, a Web application server may interface to a mainframe via an IBM CICS (Customer Information Control System) transaction gateway; CICS is a family of application servers and connectors that provides enterprise-level online transaction management and connectivity for mission-critical applications. The Web application server may invoke the security token service component to translate a Kerberos ticket (as used internally by the Web application server) to an IBM RACF® passticket required by the CICS transaction gateway.

The entities that are shown in FIG. 4 can be explained using the terminology of an "identity provider" and "service provider". As part of establishing and maintaining trust relationships, an identity provider's trust service can determine what token types are required or accepted by a service provider's trust service. Thus, trust services use this information when invoking token services from a security token service. When an identity provider's trust service is required to produce an authentication assertion for a service provider, the trust service determines the required token type and requests the appropriate token from the security token service.

When a service provider's trust service receives an authentication assertion from an identity provider, the trust service knows what type of assertion that it expected and what type of assertion that it needs for internal use within the service provider. The service provider's trust service therefore requests that the security token service generate the required internal-use token based on the token in the received authentication assertion.

Both trust services and trust brokers have the ability to translate an assertion received from an identity provider into a format that is understood by a service provider. The trust broker has the ability to interpret the assertion format (or formats) for each of the trust services with whom there is a direct trust relationship, thereby allowing the trust broker to provide assertion translation between an identity provider and a service provider. This translation can be requested by either party through its local trust service. Thus, the identity provider's trust service can request translation of an assertion before it is sent to the service provider. Likewise, the service provider's trust service can request translation of an assertion received from an identity provider.

Assertion translation comprises user identity translation, authentication assertion translation, attribute assertion translation, or other forms of assertion translation. Reiterating the point above, assertion translation is handled by the trust components within a federation, e.g., trust services and trust brokers. A trust service may perform the translation locally, either at the identity provider or at the service provider, or a trust service may invoke assistance from a trust broker.

Assuming that an identity provider and a service provider already have individual trust relationships with a trust broker, the trust broker can dynamically create, i.e. broker, new trust relationships between issuing parties and relying parties if necessary. After the initial trust relationship brokering operation that is provided by the trust broker, the identity provider and the service provider may directly maintain the relationship so that the trust broker need not be invoked for future translation requirements. It should be noted that translation of authentication tokens can happen at three possible places: the identity provider's trust service, the service provider's trust service, and the trust broker. Preferably, the identity provider's trust service generates an authentication assertion that is understood by the trust broker to send to the service provider. The service provider then requests a translation of this token from the trust broker into a format recognizable by the service provider. Token translation may occur before transmission, after transmission, or both before and after transmission of the authentication assertion.

Typically, there are two types of "trust domains" that must be managed: enterprise trust domains and federation trust domains. The differences between these two types of trust domain are based in part on the business agreements governing the trust relationships with the trust domain and the technology used to establish trust. An enterprise trust domain contains those components that are managed by the enterprise; all components within that trust domain may implicitly trust each other. In general, there are no business agreements required to establish trust within an enterprise because the deployed technology creates inherent trust within an enterprise, e.g., by requiring mutually authenticated SSL sessions between components or by placing components within a single, tightly controlled data center such that physical control and proximity demonstrate implicit trust. Referring to FIG. 2B, the legacy applications and back-end processing systems may represent an enterprise trust domain, wherein the components communicate on a secure internal network.

Federation trust domains are those that cross enterprise boundaries; from one perspective, a federation trust domain may represent trust relationships between distinct enterprise trust domains. Federation trust domains are established through trust proxies across enterprise boundaries between federation partners. Trust relationships involve some sort of a bootstrapping process by which initial trust is established between trust proxies. Part of this bootstrap process may include the establishment of shared secret keys and rules that define the expected and/or allowed token types and identifier translations. In general, this bootstrapping process can be implemented out-of-band as this process may also include the establishment of business agreements that govern an enterprise's participation in a federation and the liabilities associated with this participation.

In the exemplary federation architecture, the trust relationships are managed by the trust proxies, which may include (or may interact with) a security token service that validates and translates a token that is received from an identity provider based on the pre-established relationship between two trust proxies. In situations where it is not feasible for a federated enterprise to establish trust relationships (and token translation) with another federated enterprise, a trust broker may be invoked; however, the federated enterprise would need to establish a relationship with a trust broker.

Figure 5:
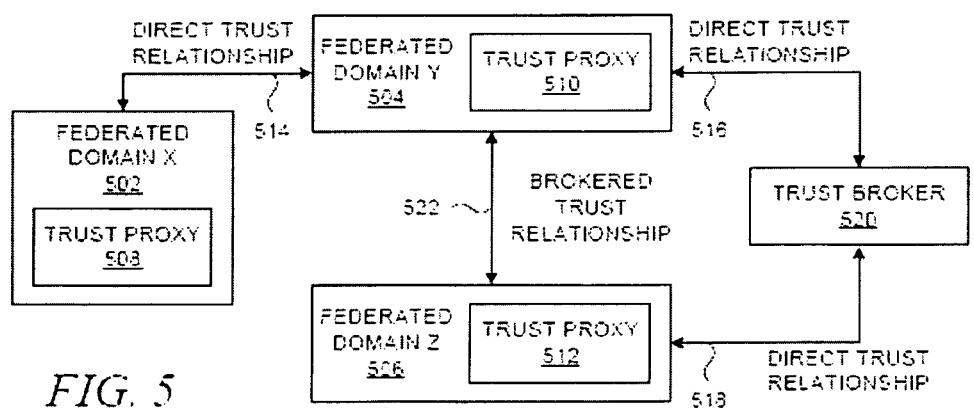
FIG. 5 depicts a block diagram that illustrates an exemplary set of trust relationships between federated domains using trust proxies and a trust broker in accordance with an exemplary federated architecture that is able to support the described subject matter.

With reference now to FIG. 5, a block diagram depicts an exemplary set of trust relationships between federated domains using trust proxies and a trust broker in accordance with an exemplary federated architecture. Although FIG. 4 introduced the trust broker, FIG. 5 illustrates the importance of transitive trust relationships within the exemplary federated architecture.

Federated domains 502-506 incorporate trust proxies 508-512, respectively. Trust proxy 508 has direct trust relationship 514 with trust proxy 510. Trust broker 520 has direct trust relationship 516 with trust proxy 510, and trust broker 520 has direct trust relationship 518 with trust proxy 512. Trust broker 520 is used to establish, on behalf of a federation participant, a trust relationship based on transitive trust with other federation partners. The principle of transitive trust allows trust proxy 510 and trust proxy 512 to have brokered trust relationship 522 via trust broker 520. Neither trust proxy 510 nor 512 need to know how to translate or validate the other's assertions; the trust broker may be invoked to translate an assertion into one that is valid, trusted, and understood at the other trust proxy.

Business agreements that specify contractual obligations and liabilities with respect to the trust relationships between federated enterprises can be expressed in XML through the use of the ebXML (Electronic Business using XML) standards. For example, a direct trust relationship could be represented in an ebXML document; each federated domain that shares a direct trust relationship would have a copy of a contract that is expressed as an ebXML document. Operational characteristics for various entities within a federation may be specified within ebXML choreographies and published within ebXML registries; any enterprise that wishes to participate in a particular federation, e.g., to operate a trust proxy or trust broker, would need to conform to the published requirements that were specified by that particular federation for all trust proxies or trust brokers within the federation. A security token service could parse these ebXML documents for operational details on the manner in which tokens from other domains are to be translated. It should be noted, though, that other standards and mechanisms could be employed to support the present invention for specifying the details about the manner in which the trust relationships within a federation are implemented.

During a given user's session, the user may visit many federated domains to use the web services that are offered by those domains. Domains can publish descriptions of services that they provide using standard specifications such as UDDI and WSDL, both of which use XML as a common data format. The user finds the available services and service providers through applications that also adhere to these standard specifications. SOAP provides a paradigm for communicating requests and responses that are expressed in XML. Entities within a federated environment may employ these standards among others.

Within a federation, a user expects to have a single-sign-on experience in which the user completes a single authentication operation, and this authentication operation suffices for the duration of the user's session, regardless of the federation partners visited during that session. A session can be defined as the set of transactions from (and including) the initial user authentication, i.e. logon, to logout. Within a session, a user's actions will be governed in part by the privileges granted to the user for that session.

The federated architecture that is described above supports single-sign-on operations. To facilitate a single-sign-on experience, web services that support the federated environment will also support using an authentication assertion or security token generated by a third-party to provide proof of authentication of a user. This assertion will contain some sort of evidence of the user's successful authentication to the issuing party together with an identifier for that user. For example, a user may complete traditional authentication operation with one federation partner, e.g., by providing a username and password that the federation partners uses to build authentication credentials for the user, and then the federation partner is able to provide a SAML authentication assertion that is generated by the authenticating/issuing party to a different federation partner.

The federated environment also allows web services or other applications to request web services, and these web services would also be authenticated. Authentication in a web services environment is the act of verifying the claimed identity of the web services request so that the enterprise can restrict access to authorized clients. A user who requests or invokes a web service would almost always be authenticated, so the need for authentication within a federated environment that supports the present invention is not any different from current requirements of web services for user authentication.

Authentication of users that are accessing the computational resources of an enterprise without participating in a federated session are not impacted by the presence of a federated infrastructure. For example, an existing user who authenticates with a forms-based authentication mechanism over HTTP/S to access non-federated resources at a particular domain is not affected by the introduction of support at the domain for the federated environment. Authentication is handled in part by a point-of-contact server, which in turn may invoke a separate trust proxy or trust service component; the use of a point-of-contact server minimizes the impact on the infrastructure of an existing domain. For example, the point-of-contact server can be configured to pass through all non-federated requests to be handled by the back-end or legacy applications and systems at the domain.

The point-of-contact server may choose to invoke an HTTP-based authentication method, such as basic authentication, forms-based authentication, or some other authentication method. The point-of-contact server also supports a federation domain by supporting the processing of an assertion that has been presented by the user as proof of authentication, such as an SAML authentication assertion, wherein the assertion has crossed between enterprise domains; the single-sign-on protocol service is used to recognize an assertion/artifact when it is received in the context of a federation protocol. The point-of-contact server may invoke the trust service, which in turn may invoke its security token service for validation of authentication credentials/security tokens.

Authentication of web services or other applications comprises the same process as authentication of users. Requests from web services carry a security token containing an authentication assertion, and this security token would be validated by the trust service in the same manner as a token presented by a user. A request from a web service should be accompanied by this token because the web service would have discovered what authentication assertions/security tokens were required by the requested service as advertised in UDDI.

Figure 6:
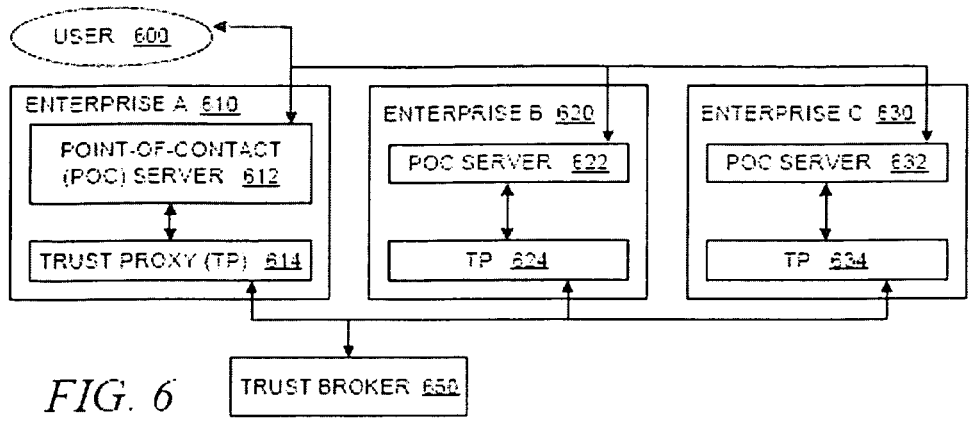
FIG. 6 depicts a block diagram that illustrates a federated environment that supports federated single-sign-on operations.

With reference now to FIG. 6, a block diagram depicts a federated environment that supports federated single-sign-on operations. User 600, through a client device and an appropriate client application, such as a browser, desires to access a web service that is provided by enterprise/domain 610, which supports data processing systems that act as a federated domain within a federated environment. Domain 610 supports point-of-contact server 612 and trust proxy or trust service 614; similarly, domain 620 supports point-of-contact server 622 and trust proxy or trust service 624, while domain 630 supports point-of-contact server 632 and trust proxy or trust service 634. The trust proxies/services rely upon trust broker 650 for assistance, as described above. Additional domains and trust proxies/services may participate in the federated environment. FIG. 6 is used to describe a federated single-sign-on operation between domain 610 and domain 620; a similar operation may occur between domain 610 and domain 630.

The user completes an authentication operation with respect to domain 610; this authentication operation is handled by point-of-contact server 612. The authentication operation is triggered when the user requests access to some resource that requires an authenticated identity, e.g., for access control purposes or for personalization purposes. Point-of-contact server 612 may invoke a legacy authentication service, or it may invoke trust proxy 614 to validate the user's presented authentication credentials. Domain 610 becomes the user's identity provider or home domain for the duration of the user's federated session.

At some later point in time, the user initiates a transaction at a federation partner, such as enterprise 620 that also supports a federated domain, thereby triggering a federated single-sign-on operation. For example, a user may initiate a new transaction at domain 620, or the user's original transaction may cascade into one or more additional transactions at other domains. As another example, the user may invoke a federated single-sign-on operation to a resource in domain 620 via point-of-contact server 612, e.g., by selecting a special link on a web page that is hosted within domain 610 or by requesting a portal page that is hosted within domain 610 but that displays resources hosted in domain 620. Point-of-contact server 612 sends a request to trust proxy 614 to generate a federation single-sign-on token for the user that is formatted to be understood or trusted by domain 620. Trust proxy 614 returns this token to point-of-contact server 612, which sends this token to point-of-contact server 622 in domain. Domain 610 acts as an issuing party for the user at domain 620, which acts as a relying party. The user's token would be transferred with the user's request to domain 620; this token may be sent using HTTP redirection via the user's browser, or it may be sent by invoking the request directly of point-of-contact server 622 (over HTTP or SOAP-over-HTTP) on behalf of the user identified in the token supplied by trust proxy 614.

Point-of-contact server 622 receives the request together with the federation single-sign-on token and invokes trust proxy 624. Trust proxy 624 receives the federation single-sign-on token, validates the token, and assuming that the token is valid and trusted, generates a locally valid token for the user. Trust proxy 624 returns the locally valid token to point-of-contact server 622, which establishes a session for the user within domain 620. If necessary, point-of-contact server 622 can initiate a federated single-sign-on at another federated partner.

Validation of the token at domain 620 is handled by the trust proxy 624, possibly with assistance from a security token service. Depending on the type of token presented by domain 610, the security token service may need to access a user registry at domain 620. For example, domain 620 may provide a binary security token containing the user's name and password to be validated against the user registry at domain 620. Hence, in this example, an enterprise simply validates the security token from a federated partner. The trust relationship between domains 610 and 620 ensures that domain 620 can understand and trust the security token presented by domain 610 on behalf of the user.

Federated single-sign-on requires not only the validation at the relying domain of the security token that is presented to a relying domain on behalf of the user but also, based on information contained in the security token, the determination of a locally valid user identifier and possibly attributes that are associated with this identifier. One result of a direct trust relationship and the business agreements that are required to establish such a relationship is that at least one party, either the issuing domain or the relying domain or both, will know how to translate the information provided by the issuing domain into an identifier that is valid at the relying domain; this identifier at the relying domain may be the result of a one-to-one mapping of the identity asserted by the issuing party or the result of another type of mapping, e.g., a many-to-one mapping of an identity to a role, i.e. it is not a requirement that this be a unique one-to-one mapping for local, issuing party identifiers. In the brief example above, it was assumed that the issuing domain, i.e. domain 610, is able to provide the relying domain, i.e. domain 620, with a user identifier that is valid in domain 620. In that scenario, the relying domain did not need to invoke any identity mapping functionality. Trust proxy 624 at domain 620 will generate a security token for the user that will "vouch-for" this user. The types of tokens that are accepted, the signatures that are required on tokens, and other requirements are all pre-established as part of the federation's business agreements. The rules and algorithms that govern identifier translation are also pre-established as part of the federation's business agreements and are defined by the agreed-upon policy for token management and exchange. In the case of a direct trust relationship between two participants, the identifier translation algorithms will have been established for those two parties and may not be relevant for any other parties in the federation.

However, it is not always the case that the issuing domain will know how to map the user from a local identifier for domain 610 to a local identifier for domain 620. In some cases, it may be the relying domain that knows how to do this mapping, while in yet other cases, neither party will know how to do this translation, in which case a third party trust broker may need to be invoked. In other words, in the case of a brokered trust relationship, the issuing and relying domains do not have a direct trust relationship with each other. They will, however, have a direct trust relationship with a trust broker, such as trust broker 650. Identifier mapping rules and algorithms will have been established as part of this relationship, and the trust broker will use this information to assist in the identifier translation that is required for a brokered trust relationship.

Domain 620 receives the token that is issued by domain 610 at point-of-contract server 622, which invokes trust proxy 624 to validate the token and perform identity mapping. In this case, since trust proxy 624 is not able to map the user from a local identifier for domain 610 to a local identifier for domain 620, trust proxy 624 invokes trust broker 650, which validates the token and performs the identifier mapping. After obtaining the local identifier for the user, trust proxy 624, possibly through its security token service, can generate any local tokens that are required by the back-end applications at domain 620, e.g., a Kerberos token may be required to facilitate single-sign-on from the point-of-contact server to the application server. After obtaining a locally valid token, if required, the point-of-contact server is able to build a local session for the user. The point-of-contract server may also handle coarse-grained authorization of user requests and forward the authorized requests to the appropriate application servers within domain 620.

Federated User Lifecycle Management (FULM) functionality/service comprises functions for supporting or managing federated operations with respect to the particular user accounts or user profiles of a given user at multiple federated domains. A representative FULM functionality is described in U.S. Publication No. 20080010665, titled "Method and system for policy-based initiation of federation management," the disclosure of which is incorporated herein by reference. In some cases, the functions or operations are limited to a given federated session for the user. In other words, federated user lifecycle management functionality refers to the functions that allow management of federated operations across a plurality of federated partners, possibly only during the lifecycle of a single user session within a federated computing environment.

Each federated domain might manage a user account, a user profile, or a user session of some kind with respect to the functions at each respective federated domain. For example, a particular federated domain might not manage a local user account or user profile within the particular federated domain, but the federated domain might manage a local user session for a federated transaction after the successful completion of a single-sign-on operation at the federated domain. As part of the federated user lifecycle management functionality that is supported by that particular federated domain, the federated domain can participate in a single-sign-off operation that allows the federated domain to terminate the local user session after the federated transaction is complete, thereby improving security and promoting efficient use of resources.

In another example of the use of federated user lifecycle management functionality, a user may engage in an online transaction that requires the participation of multiple federated domains. A federated domain might locally manage a user profile in order to tailor the user's experience with respect to the federated domain during each of the user's federated sessions that involve the federated domain. As part of the federated user lifecycle management functionality that is supported by that particular federated domain, the information in the federated domain's local user profile can be used in a seamless manner during a given federated transaction with information from other profiles at other federated domains that are participating in the given federated transaction. For example, the information from the user's multiple local user profiles might be combined in some type of merging operation such that the user's information is visually presented to the user, e.g., within a web page, in a manner such that the user is not aware of the different origins or sources of the user's information.

Federated user lifecycle management functionality may also comprise functions for account linking and de-linking. A user is provided with a common unique user identifier across federation partners, which enables single-sign-on and the retrieval of attributes (if necessary) about a user as part of the fulfillment of a request at one federation partner. Furthermore, the federation partner can request additional attributes from an identity provider using the common unique user identifier to refer to the user in an anonymous manner.

Figure 7A:
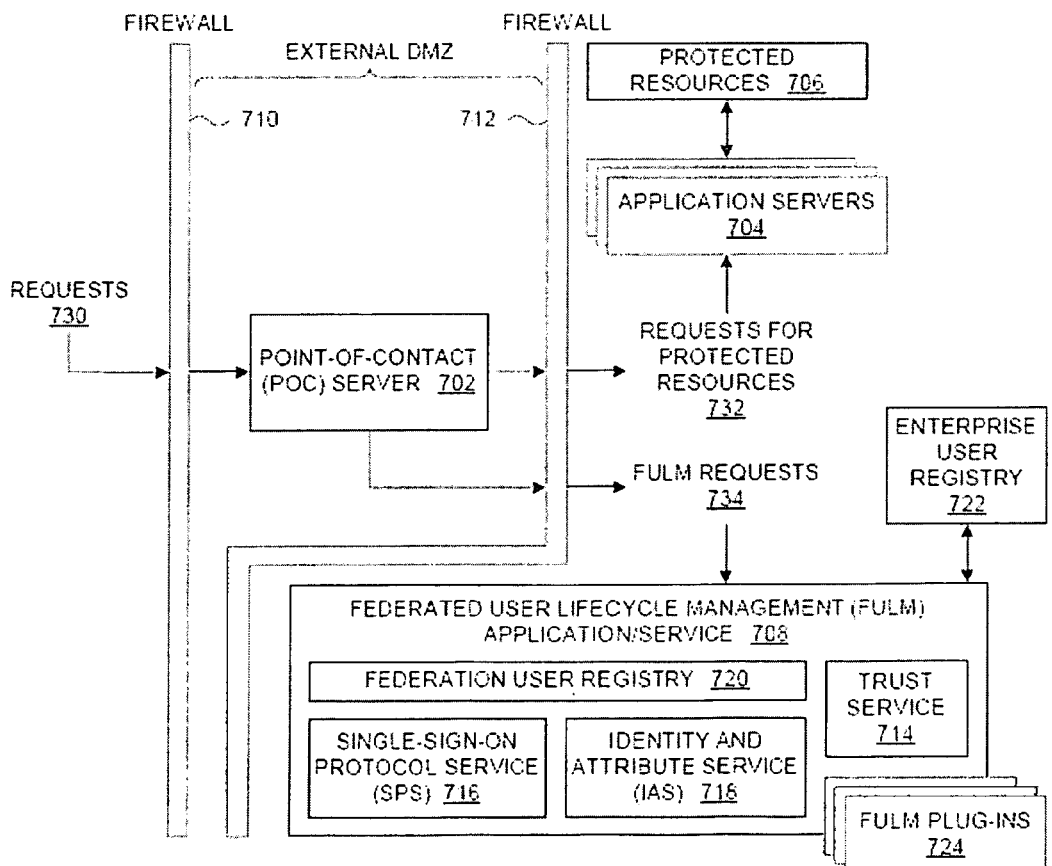
FIG. 7A illustrates a prior art technique for implementing federated user lifecycle management functionality.

With reference now to FIG. 7A, and as described in U.S. Publication No. 20080010665, filed Jul. 7, 2006, the disclosure of which is incorporated by reference, a block diagram provides additional detail of the components in a federated domain for implementing federated user lifecycle management functionality. FIG. 7A depicts elements at a single federated domain. In FIG. 7A, point-of-contact server 702 is illustrated as residing within the DMZ between firewalls 710 and 712, which form an electronic or physical front-end to the enterprise domain; in addition, federated user lifecycle management application/service 708 resides electronically behind firewall 712. Trust service 714, single-sign-on protocol service 716, and identity-and-attribute service 718 employ enterprise user registry 720 and federation user registry 722 as necessary; a user typically is a natural person but may be a data processing entity that uses a computational resource.

Referring again to FIG. 7A, federated user lifecycle management application 708 also comprises support for interfacing to, interacting with, or otherwise interoperating with federated user lifecycle management plug-ins 724. In the exemplary architecture that is shown in FIG. 7A, federated protocol runtime plug-ins provide the functionality for various types of independently published or developed federated user lifecycle management standards or profiles, such as: WS-Federation Passive Client; and Liberty Alliance ID-FF Single Sign On (B/A, B/P and LECP), Register Name Identifier, Federation Termination Notification, and Single Logout. Different sets of federated protocols may be accessed at different URIs. This approach allows the federated user lifecycle management application to concurrently support multiple standards or specifications of federated user lifecycle management, e.g., the WS-Federation web services specification versus the Liberty Alliance's specifications, within a single application, thereby minimizing the configuration impact on the overall environment for supporting different federation protocols.

The federated user lifecycle management functionality is invoked by the point-of-contact server by redirecting and/or forwarding user requests to the federated user lifecycle management application as appropriate. Referring again to FIG. 7A, point-of-contact server 702 receives user requests 730, which are then analyzed to determine the type of request that has been received, which might be indicated by the type of request message that has been received or, as noted above, by determining the destination URI within the request message. While requests 732 for protected resources continue to be forwarded to application servers 704, requests 734 for federated user lifecycle management functions, e.g., requests to invoke a single-sign-off operation, are forwarded to federated user lifecycle management application 708, which invokes the appropriate federated user lifecycle management plug-in as necessary to fulfill the received request. When a new federation protocol or a new federated function is defined, or when an existing one is somehow modified or refined, support can be added simply by plugging a new support module or can be refined by modifying a previously installed plug-in.

The exemplary implementation of a federated user lifecycle management application in FIG. 7A illustrates that the federated user lifecycle management application is able to support multiple, simultaneous, federated user lifecycle management functions while providing a "plug-in" functionality, thereby allowing new functionality to be added to the federated user lifecycle management application in the form of a plug-in when heeded without requiring any changes to the existing infrastructure. For example, assuming that the described subject matter is implemented using a Java™-based federated user lifecycle management application, support for a new federation protocol, such as a newly published single-sign-on protocol, can be added by configuring newly developed Java™ classes to the Java™ CLASSPATH of the federated user lifecycle management application, wherein these new classes support the new standard along with the protocol interface for supporting the described subject matter. Thus, the exemplary federated architecture leverages the existing environment in which a federated user lifecycle management solution is to be integrated. The federated user lifecycle management application can be easily modified to support new protocols/standards as they evolve with minimal changes to the overall infrastructure. Any changes that might be required to support new federated user lifecycle management functionality are located almost exclusively within the federated user lifecycle management application, which would require configuring the federated user lifecycle management application to understand the added functionality.

There may be minimal configuration changes in other federated components, e.g., at a point-of-contact server, to allow the overall infrastructure to be able to invoke new federated user lifecycle management functionality while continuing to support existing federated user lifecycle management functionality. The federated user lifecycle management applications, however, are functionally independent from the remainder of the federated components in that the federated user lifecycle management applications may require only minimal interaction with other federated components of the federated environment. For example, in an exemplary embodiment, the federated user lifecycle management functionality may integrate with an enterprise-based data store, e.g., an LDAP data store, if federated user lifecycle management information (such as NameIdentifier values in accordance with the Liberty Alliance profiles) are to be stored in an externally-accessible federated user lifecycle management data store as opposed to a private, internal, federated user lifecycle management data store that is not apparent or accessible to external entities.

Some federated operations, such as those that might require minimal interaction with the user to complete an operation, should be performed in a manner that is minimally burdensome on the user, but they should also be performed in a manner that is efficient for the federated enterprises, particularly for those types of operations that might be required across all users within an enterprise. With respect to operations that are required in order to support certain federated protocols, a federated enterprise may not have much flexibility in the manner in which those operations are implemented and the resulting burdens on the users and on the federated enterprise's computational resources. A federated enterprise may be required to perform certain actions in certain ways in accordance with federation specifications to which the federated enterprise has agreed. In other words, a federated enterprise may be required by business contracts to implement certain federation operations without regard to the computational burden of those operations.

Many aspects of functionality within a federated environment, however, could be categorized as operations that support one or more business goals that are desired by one or more enterprises within a federation yet are not necessarily required to support federation protocols or that are not necessarily required in order to participate within a federation. Moreover, the implementation of operations to fulfill these business goals may trigger the execution of various federation operations that result in interaction with participating federation partners. Since the resulting actions for supporting an enterprise-specific business goal may have ramifications across a federated environment, the manner in which the supporting operations are implemented should be accomplished in a manner that is scalable across thousands or millions of users within a federation. In addition, a system administrator with responsibilities of managing federated functionality within an enterprise should be able to configure its computational resources in a convenient manner when implementing the desired business goals of the enterprise.

Figure 7B:
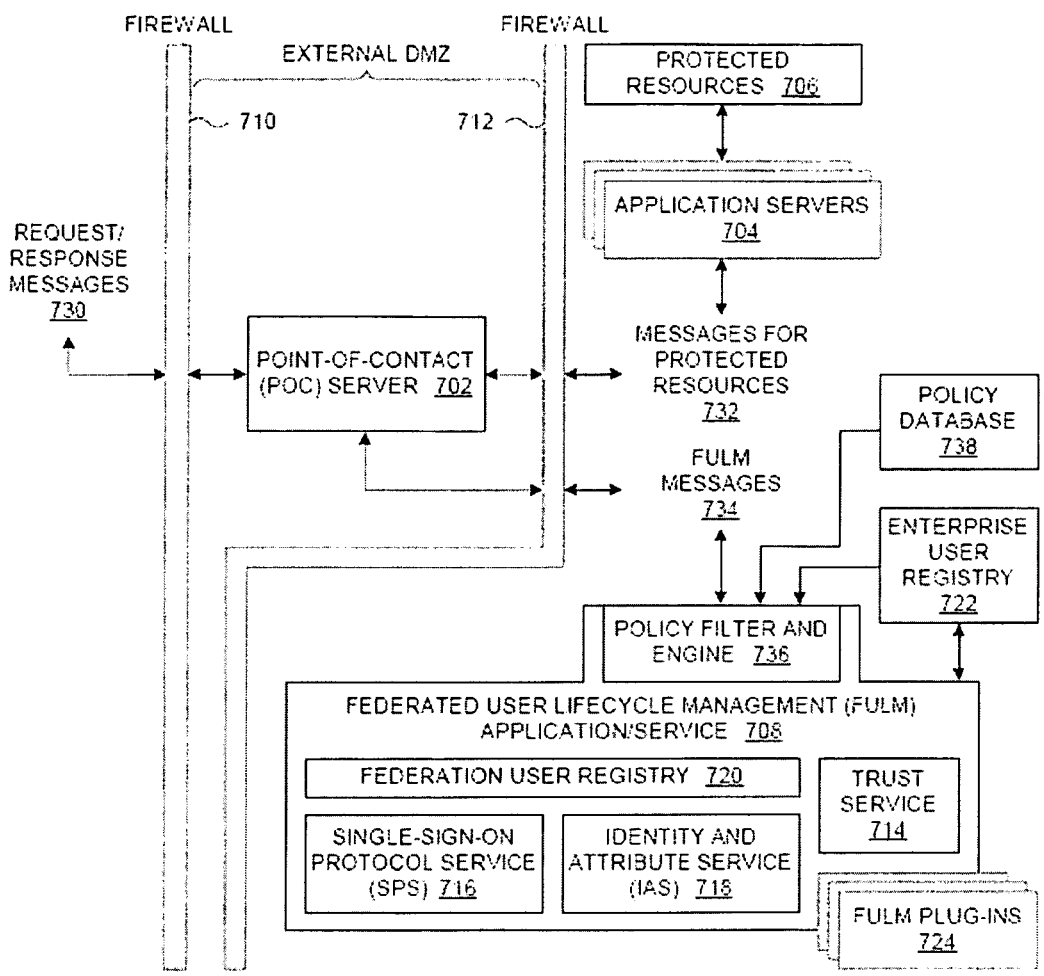
FIG. 7B illustrates another known technique for implementing federated user lifecycle management functionality while implementing policy-based mechanisms for such functionality.

To those ends, U.S. Publication No. 20080010665, filed Jul. 7, 2006, provides a policy-based mechanism and related computational infrastructure that provides for efficient and configurable management of the infrastructure to accomplish desired business goals. The infrastructure described there allows federated operations to be managed in a scalable manner through the use of policies and related policy management mechanisms. With reference now to FIG. 7B, a block diagram depicts some of the components in a federated domain for implementing federated user lifecycle management functionality while also implementing policy-based mechanisms for accomplishing various business goals that may employ federated user lifecycle management functionality. FIG. 7B is very similar to FIG. 7A in that both figures show an exemplary arrangement of components for implementing federated user lifecycle management functionality. In contrast to FIG. 7A, request/response messages 730, protected resource messages 732, and FULM messages 734 are shown as incoming and outgoing messages with respect to an enterprise's data processing system, thereby emphasizing that this approach is applicable to both the pre-processing and post-processing of incoming and outgoing data traffic.

The system that is shown in FIG. 7B has been enhanced to include additional functionality for supporting policy-based initiation of federated user lifecycle management functionality in a minimally burdensome manner. In FIG. 7B, FULM application/service 708 includes policy filter/engine 736. As incoming FULM request messages 734 are received at FULM application/service 708 from point-of-contact server 702, or as outgoing FULM response messages are being processed by FULM application/service 708 from various components for forwarding to point-of-contact server 702, the messages are filtered by policy filter/engine 736 by checking whether any policies, e.g., as stored within policy database 738, have been configured which require additional federation-relation processing on the incoming or outgoing messages. For example, a policy may require additional pre-processing of an incoming request message prior to fulfilling that request. Likewise, a policy may require additional post-processing of an outgoing response message prior to returning that response. In other words, the placement of policy filter/engine 736 at the head/tail of the processing stream for the incoming/outgoing FULM messages ensures that additional pre-processing or post-processing steps may be performed prior to initiating or concluding processing of a FULM message, i.e. prior to initiating the processing of an incoming FULM request or prior to concluding the processing of an outgoing FULM response.

In some cases, the evaluation of a policy may indicate that additional pre-processing or post-processing is required, and in other cases, the evaluation of a policy may indicate that additional pre-processing or post-processing is not required. From this perspective, policy engine 736 can be viewed as filtering the incoming and outgoing messages. Policy engine 736 will allow some incoming requests to be fulfilled immediately without additional pre-processing steps while diverting or suspending other requests until additional pre-processing steps can be performed. Likewise, policy engine 736 will allow some outgoing responses to be forwarded immediately without additional post-processing steps while diverting or suspending other responses until additional post-processing steps can be performed.

In an alternative embodiment, a policy engine/filter may be associated with the point-of-contact server 702 and/or associated with the one or more application servers 704. In such embodiment, and as will be described in more detail below, the one or more FULM plug-ins 724 provide digital rights management (DRM) functionality. They are sometimes referred to herein as DRM plug-ins.

Figure 7C:
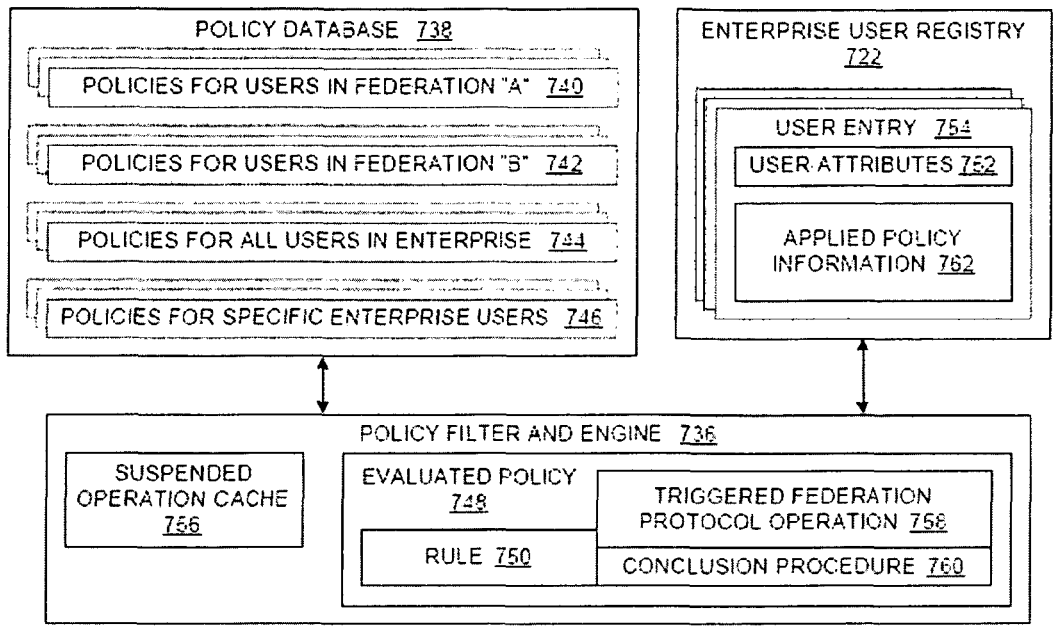
FIG. 7C shows additional detail for some of the data elements that are handled in association with the policy filter and engine of FIG. 7B in relation to FULM messages.

With reference now to FIG. 7C, a block diagram shows additional detail for some of the data elements that are handled in association with evaluating a policy by a policy engine in relation to FULM messages in accordance with an embodiment. FIG. 7C contains similar elements to those shown in FIG. 7B as illustrated using identical reference numerals for similar elements. Preferably, the functionality of a policy engine is embedded into the processing of federation profiles in a manner such that the policy may be enforced when a FULM request is received or when a FULM response is returned; any operations that are indicated within the policy may be performed as pre-processing or post-processing steps either prior to further processing of a FULM request or prior to concluding the processing of a FULM response. The policy-based pre-processing and post-processing is not intended to preclude the use of policies that may occur elsewhere within the runtime processing of the content within FULM messages. Policies may be stored in one or more data stores, such as policy database 738. Because an enterprise may participate in more than one federation, i.e. may support functionality for multiple federated computing environments, FULM messages may be processed with respect to different federation profiles, and policy database 738 may contain different sets of policies for different federation profiles. In this illustrated example, policy set 740 is applicable to users in a first federation, while policy set 742 is applicable to users in a second federation; users may be registered within multiple federations, so policy set 740 and policy set 742 are not necessarily applicable only to mutually exclusive sets of users. Policy set 744 is applicable to all users within the current enterprise, i.e. the enterprise that supports the data processing environment that is shown in FIGS. 7A-7C. Policy set 746 is applicable to specific individual users within the enterprise.

The different types of policies that are shown in FIG. 7C merely illustrate the enforceability of some of the policies that might be applied within the enterprise; policies within the database are not necessarily stored as disassociated sets as shown in FIG. 7C. Policies may be represented in any appropriate format, such as being defined in XML (eXtensible Markup Language) and represented as XSLT (XSL Transformation or eXtensible Stylesheet Language Transformation), which can be used to transform an XML document into another XML document. Policy engine 736 evaluates the rule or rules within a policy. For example, an XSLT rules engine can be invoked when an incoming profile request is received prior to initial processing of the profile request. Evaluated policy 748 represents a policy that is being evaluated or that has been evaluated. Rule 750 represents a conditional expression within the policy; the conditional expression indicates a condition based on a set of parameters or data values that are evaluated in accordance with logical operators. If an expression evaluates as a logical or boolean "true" value, then the rule is said to be triggered or activated; if the expression evaluates as a logical or boolean "false" value, then the rule is not triggered or activated. From one perspective, a policy's rule may be viewed as an "if-then" conditional statement that causes certain additional processing only when the associated condition is evaluated to be true or is evaluated as being satisfied. One or more values in the conditional expression may be obtained from user attributes 752 in user entry 754 in user registry 722. In this example, user entry 754 is associated with the user on behalf of which the original FULM message was received; for example, the originally received FULM message may contain a user identifier that may be used to lookup information about a user within user registry 722. In turn, the retrieved user attributes are used to determine policies that are enforceable when the original FULM message is received.

If a rule within a policy is triggered, then depending upon whether the message is an outgoing response or an incoming request, the conclusion of processing of the originally received response is suspended or further processing of the originally received request is suspended. In this manner, the federation protocol operation that was to be performed for the received message, e.g., by FULM application/service 708 that is shown in FIG. 7B, is postponed until a subsequent point in time. During the suspension or postponement, FULM message 734 that is shown in FIG. 7B could be stored in an appropriate location, such as suspended operation cache 756, or in some other data store, such as user entry 754 in user registry 722 or a session cache that contains other information for session management for the user.

After a rule within a policy has been evaluated such that it triggers or activates additional pre-processing or post-processing, the policy is then examined for information that is contained therein about the type of additional pre-processing or post-processing that is to be performed when its rule is triggered. More specifically, for an incoming request message, the policy indicates a federation protocol operation that is to be performed before performing any other federation protocol operations that might be associated with the original FULM request that has been suspended. Likewise, for an outgoing response message, the policy indicates a federation protocol operation that is to be performed before performing any other federation protocol operations that might be associated with the outgoing FULM response that has been suspended. FIG. 7C illustrates that policy 748 contains identifying data or indicating data for triggered federation protocol operation 758 that is associated with rule 750.

Policy 748 may also contain information about one or more conclusion procedures 760 that indicate any processes that are to be performed upon conclusion of triggered federation protocol operation 758. For example, after triggered federation protocol operation 758 is concluded, applied policy information 762 may be set within user entry 754 that indicates that a particular policy has been applied, i.e. enforced; each such entry may have a reference to its associated policy or an identifier for its associated policy along with additional information, such as an indication of whether the policy was enforced successfully or unsuccessfully, one or more timestamps that indicate when the policy was enforced, and other relevant information. In some cases, information about conclusion procedure 760 may indicate that the originally received FULM message may be allowed to proceed even if triggered federation protocol operation 758 has failed, e.g., in those cases in which the policy indicates a federation protocol operation that is not mandatory or that is not time-critical because the policy may be re-run at some later point in time. In some cases, information about conclusion procedure 760 may indicate that the originally received FULM message cannot proceed if triggered federation protocol operation 758 has failed, e.g., in those cases in which the policy indicates a federation protocol operation that is mandatory or that is time-critical. Depending upon the information about conclusion procedure 760, the originally received FULM message is retrieved from the appropriate data store, such as suspended operation cache 756, and then further processed or rejected.

Digital rights management (DRM) policy may be implemented by one or more DRM plug-ins that are managed and operated by a DRM policy provider for the benefit of a service provider as part of policy enforcement. A DRM plug-in may be added as DRM resources are added to the service provider environment and, as will be seen, such plug-ins are used advantageously to handle the retrieval of additional DRM attributes (referred to below as DRM privileges) as necessary.

As used herein, a "DRM" is information (e.g., an attribute) that describes an ability to do an action that is controlled by a DRM policy. For example, a given DRM privilege may offer a user (for a given fee) perpetual access to a given web site (e.g., audible.com) with ability to play audio books on any device.

As used herein, a "DRM policy" is information that describes what DRM privileges are required before a user can undertake a given action in the context of a digital rights management scheme. For example, if user has a subscription to Audible and the ability to play downloaded on iTunes, a DRM policy may enable the user to play downloaded music on an iPod or a GPS mobile device.

A DRM privilege may encompass a plurality of different actions or rights, and a DRM policy may be filled by many different sets of DRM privileges.

DRM-Policy Enabled Federation

Figure 8:
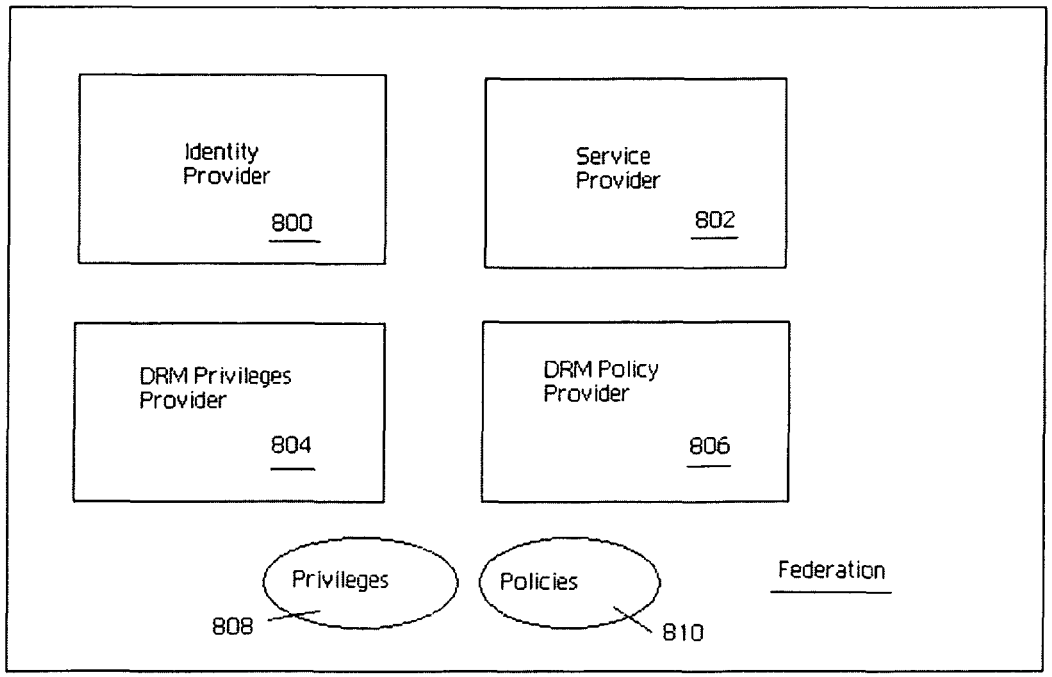
FIG. 8 is a block diagram of a set of participating entities within a DRM policy-enabled federation according to the subject matter herein.

With the above as background, the following describes a DRM-policy enabled federation. As illustrated in FIG. 8, the participants in the federation preferably include a first federation partner 800, a second federation partner 802, a third federation partner 804, and, optionally, a fourth federation partner 806. The first federation partner 800 may be an identity provider (in terms of FULM functionality) or it may be a service provider offering services that require DRM-policy compliance. For explanation purposes, the first federation partner 800 is referred to herein as the identity provider. The second federation partner 802 is the service provider that (from the end user's perspective) offers the DRM content. The third federation partner is a service provider that manages end user DRM privileges 808 and optionally DRM policies 810 that must be enforced by the second federation partner 802. The fourth federation partner 806 is a DRM policy "oracle" that manages DRM policies (as opposed to DRM privileges). The DRM policy oracle function may be a function of the third federation partner, in which case the fourth federation partner is not required. In other words, the third and fourth federation partners 804 and 806 may be co-located in a single federation partner.

The first federation partner 800 may include functionality of the third federation partner 804 to thereby act an identity provider and a DRM provider in the federation. An example scenario where this would be useful is where the end user has a subscription to a music download service (such as iTunes) that allows unlimited access.

Alternatively, the second federation partner 802 may include the functionality of the third federation provider 804. In such case, the second federation partner maintains DRM information relevant to its functionality and optionally provides it to other federation partners upon request. An example scenario where this would be useful is where the music download service knows that a user alias has an unlimited subscription to the service.

First federation partner 800 may include functionality of the fourth federation partner 806. In such case, the first federation partner 800 acts as an identity provider and DRM policy provider, although typically such policy is likely to be coarse-gained. An example scenario where this would be useful is where the end user desires to access a music download service through single sign-on (SSO) from the identity provider and needs to have proof of a valid subscription to that service.

Second federation partner 802 may include functionality of the fourth federation partner 806. In such case, the second federation partner 802 acts as the service provider and DRM policy provider. An example scenario where this would be useful is where the service provider is a music download service and it knows that, to access the service, users must at least have one month trial subscription to the service.

As already noted, third federation partner 804 may include functionality of the fourth federation partner. In such case, the third federation partner acts as a DRM provider for a user's DRM privileges and service provider DRM policy. For example, assume that the user has an unlimited subscription for a movie service (e.g., NetFlix) and that, for a given time period (e.g., the month of July), all service users have a free one-month trial for a music download service so, that by application of this policy, it can be determined that, for the month, the user has the DRM privilege of a one-month trial for the music download service.

The following are several examples of a DRM-policy enabled federation.

EXAMPLE 1

Figure 9:
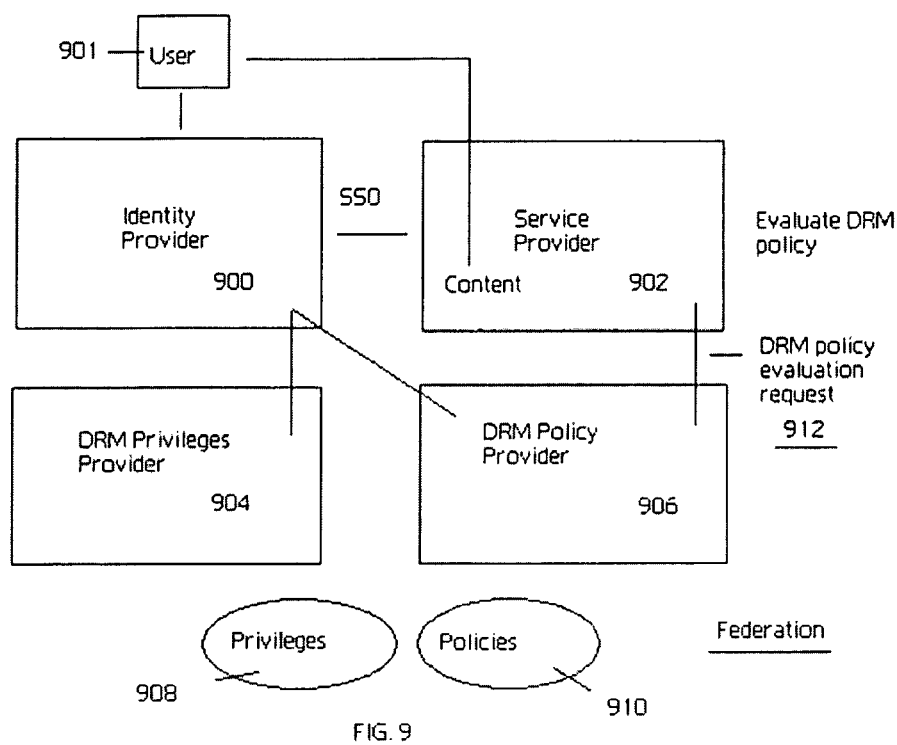
FIG. 9 illustrates a first example scenario in the DRM policy-enabled federation.

As illustrated in FIG. 9, in a first example user 901 authenticates to the first federation partner 900 and requests single sign-on to the second federation partner 902, which, from the user's perspective, offers the content. Thus, second federation partner 902 corresponds to the digital content provider previously described. As a consequence of the federation, it is assumed that the first federation partner 900 knows (or queries fourth federation partner 906 to discover) the DRM policy 910 that is enforced at second federation partner 902, and the first federation partner 900 knows (or queries third federation partner 904 to discover) the user's DRM privileges 908. First federation partner 900 then builds a single sign-on message for the second federation partner 902 with a reference to the user's DRM privileges 908. As described in U.S. Publication No. 2006/0021018, filed Jul.

21, 2004, the typical way that this is accomplished is that a pointer to an assertion containing the user's DRM privileges 908 is sent from the first federation partner 900 to the second federation partner 902 (typically with an HTTP 302, a browser-based redirect) and, in response, the second federation partner 902 requests the exchange of the pointer (also called an artifact) for the assertion containing the user's DRM privileges 908.

If the second federation partner 902 already knows the policy that it must enforce, it uses the asserted DRM privileges 908 to evaluate the policy (such as described above in FIG. 7C), thereby allowing or disallowing access based on the policy evaluation. If, however, the second federation partner 902 does not know the policy that it must enforce (or does not have the ability to evaluate compliance with the policy), the second federation partner generates a "DRM policy evaluation" request 912 to the fourth federation partner 906 (or to the third federation partner if that partner is also the DRM policy oracle). The DRM policy evaluation request provides the DRM privileges to the fourth federation partner 906, which provides either a "yes" or "no" answer lithe answer provided by the fourth federation partner is yes, access is allowed; if the answer is no, access is disallowed.

There is a possibility that the second federation partner 902 knows its DRM policy but also knows that first federation partner did not provide any/all of the information required to enable the second federation partner 902 to evaluate the policy. This may be true even if the first federation partner went to the third federation partner and queried for the DRM privileges, as the first federation partner may not have been allowed to retrieve or otherwise obtain all of the required or relevant DRM privileges such that incomplete information was sent to the second federation partner. In this event, the second federation partner 902 may request to third federation partner 904 to retrieve additional information about the user's DRM privileges so as to allow the policy evaluation.

As another variation to the approach described in the previous paragraph, the second federation partner 902 knows its DRM policy and has available to it (locally) DRM information for users; in this scenario, the second federation partner itself supplies the missing DRM privileges needed to evaluate against the DRM policy to determine whether access is allowed. As still another variation, assume that the second federation partner 902 knows its DRM policy and has available to it (locally) DRM information for users but that it is missing DRM privileges or has out-of-date information (such as consent, renewal, or the like); in this scenario, the second federation partner queries the user to get the required information before evaluating the DRM privileges against the DRM policy.

EXAMPLE 2

Figure 10:
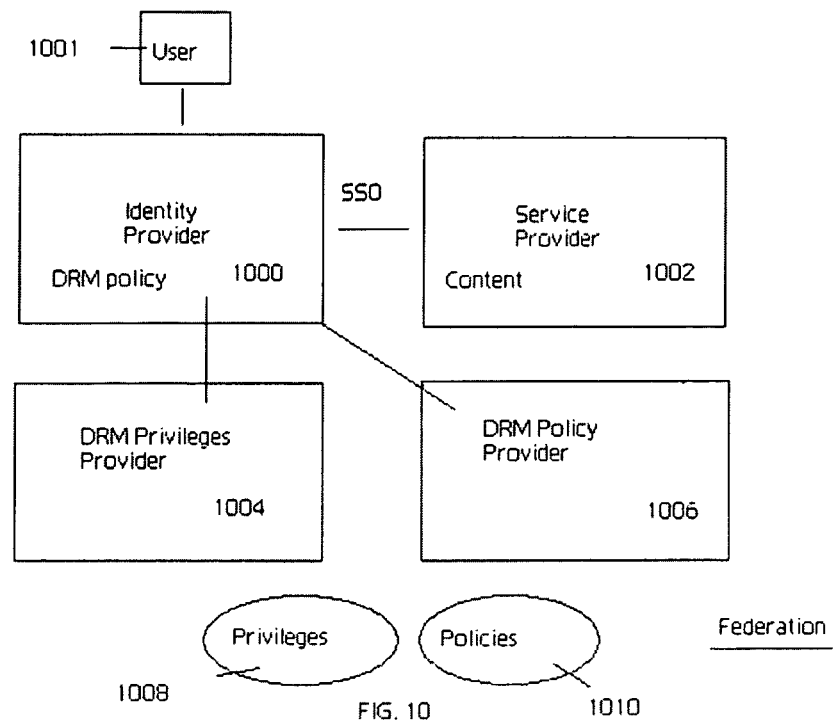
FIG. 10 illustrates a second example scenario in the DRM policy-enabled federation.

Referring now to FIG. 10, in this scenario the user 1001 authenticates to the first federation partner 1000 and requests single sign-on to the second federation partner 1002. As a result of the federation arrangement or otherwise, assume that the first federation partner 1000 already knows the DRM policy 1010 that is enforced at second federation partner 1002. In this scenario, the first federation partner 1000 knows (or queries third federation partner 1004 to discover) the user's DRM privileges 1008. In this example, the first federation partner 1000, however, does not know or is not authorized to retrieve the DRM policy 1010 from the fourth federation partner (or the third partner if that partner is the DRM policy oracle); thus, first federation partner 1000 builds the requisite artifact/assertion with the known DRM privileges 1008, and then provides that assertion to the fourth federation partner by way of the DRM policy evaluation request previously described. The fourth federation partner 1008 provides the "yes" or "no" answer. As before, if the answer provided by the fourth federation partner is yes, access is allowed by the first federation partner; if the answer is no, access is disallowed.

The above-identified example illustrates the alternative embodiment where the identity provider itself has the capability of enforcing a DRM policy against a set of one or more DRM privileges. According to this alternative embodiment, the identity provider knows or can obtain the DRM policy, and it knows or can obtain the DRM privileges as needed for the evaluation.

EXAMPLE 3

Figure 11:
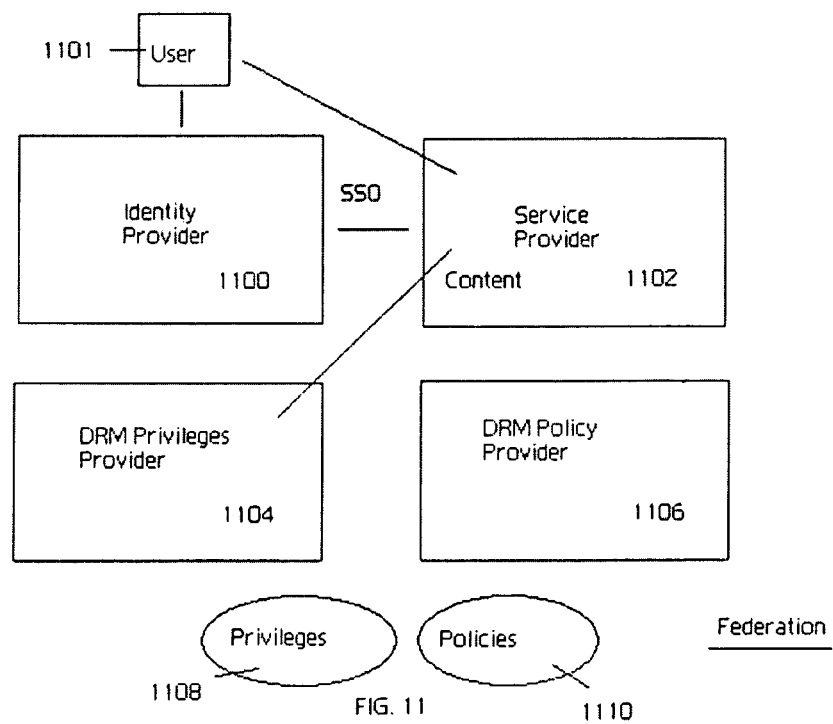
FIG. 11 illustrates a second example scenario in the DRM policy-enabled federation.

Referring now to FIG. 11, in this scenario the user 1101 authenticates to the first federation partner 1000 and requests single sign-on to second federation partner 1102. In this example, it is assumed that the first federation partner 1100 knows nothing about any DRM policy 1110 that is enforced at the second federation partner 1102. In such case, the first federation partner 1100 builds an artifact/assertion with known relevant attributes that may or may or may not include DRM privileges. Meanwhile, the second federation partner 1102 knows that the request requires DRM privileges and knows that such privileges will not be supplied by first federation partner. The second federation partner 1102 must then obtain the DRM privileges. There are several options for doing this.

A first option is that the second federation partner 1102 does a query to third federation partner 1104 to retrieve the user's DRM privileges 1108 for purposes of fulfilling the request. As a second option, the second federation partner retrieves the user's DRM privileges directly from the user 1101; to this end, the second federation partner invokes a direct interaction with the user to obtain them. Instead of invoking a direct interaction, the second federation may obtain them indirectly by retrieving consent to get these privileges, retrieving a pointer to the third federation partner, and then causing the third federation provider to trigger the user to have the privileges send to the second federation partner. In any case, once the interaction is complete and the DRM privileges, the second federation partner locally stores the collected DRM privilege information or pushes it to the third federation partner. The DRM privilege information may include an updating of the user's subscription to DRM services.

EXAMPLE 4

Figure 12:
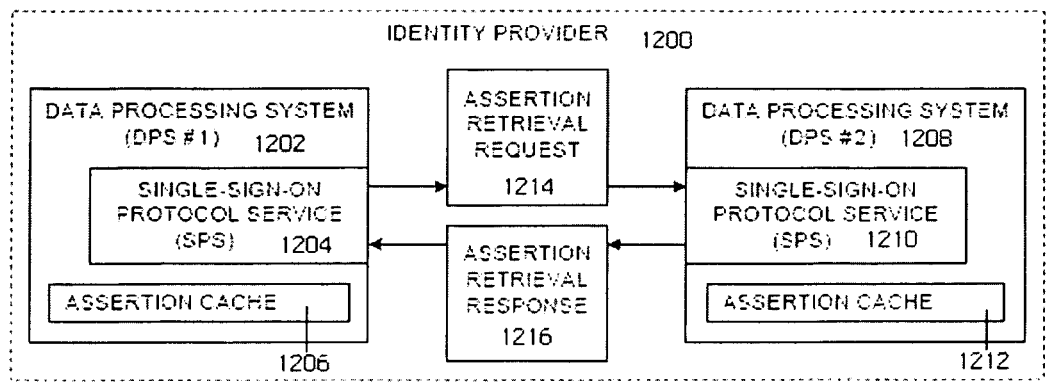
FIG. 12 illustrates a block diagram that shows a scenario in which a first data processing system retrieves an assertion from a second data processing system within an identity provider that is implemented using a distributed data processing system that supports distributed assertion retrieval.

One or more components (such as the identity provider, the service provider, the DRM privilege provider, or the DRM policy provider) of the DRM policy-enabled federation may be implemented in a distributed manner. With reference now to FIG. 12, a block diagram depicts a scenario in which a first data processing system retrieves an assertion from a second data processing system within an identity provider (by way of example only) that is implemented using a distributed data processing system that supports distributed assertion retrieval. A system of this type is described in U.S. Publication No. 20090010288, published Jan. 10, 2008. In this example, identity provider 1200 is a distributed data processing system that contains data processing system 1202, which itself contains single-sign-on service (SPS) 1204 and assertion cache 1206, along with data processing system 1208, which itself contains SPS 1210 and assertion cache 1212. At some point in time, data processing system 1202 receives an assertion retrieval request, e.g., from a service provider as described above with respect to FIG. 8. Data processing system 1202 searches its local assertion cache 1206 using the artifact that it has previously extracted from the received assertion retrieval request; the artifact may be used as a search key or as the basis for a search key. In this example, data processing system 1202 fails to locate within its local data store or cache the assertion that is associated with the artifact. If an assertion is not found in the local data store, then instead of returning an error, data processing system 1202 attempts to request the appropriate assertion from the other data processing systems that comprise the identity provider. SPS 1204 issues an assertion retrieval request to another data processing system within the identity provider, e.g., by sending assertion retrieval request 1214 to SPS 1210 at data processing system 1208. Assuming that data processing system 1208 is able to fulfill its received request, data processing system 1208 retrieves the assertion, removes it from its local data store 1212 so that it cannot be reused, and returns the assertion to data processing system 1202. Identity provider 1200 then fulfills the original assertion retrieval request that was received from a service provider by sending an assertion retrieval response to the service provider.

The identity provider can have multiple data centers that may be the source of the assertion, and the first data processing system that receives the assertion retrieval request from the service provider initiates a search of all other data processing systems or data centers that comprise the identity provider when the first data processing system does not find the requested assertion within its local assertion cache. Assuming a successful search is performed, the first data processing system is able to retrieve the requested assertion from another data processing system within the identity provider.

The first data processing system may perform the search for the requested assertion in a variety of manners. For example, the search may be performed in a chained fashion in which the data processing systems forward the search when the requested assertion is not found; the first data center will query a second data center, which will in turn query a third data center, until the requested assertion is found, at which point the assertion is returned in a bubbled or recursive fashion back to the first data center. As the search progresses, each data center can add or append an identifier that indicates which data centers have already performed the search. Alternatively, and as described in U.S. Publication No. 20080010288, the search may be performed in a serial or hub-and-spoke fashion in which the first data processing system queries one data processing system after another data processing system; the first data center acts as a hub and individually queries each data center (spoke).

In an example DRM scenario, assume that the service provider is a distributed data center implementation of an online entertainment store, and further that there is a single instance of a DRM-enforcing entity, such as the DRM policy oracle. The user accesses the music store using a web browser in the usual manner. Assume that the user has visited the store and purchased a number of downloads which, because of an existing session profile, entitles the user to receive free access to an online video. On the user's checkout page, the service provider includes a link that invites the user to get access to the video. The user clicks on the link and is redirected to an online video storefront, together with an artifact bound request. The video store receives the artifact bound request, unbinds the request, extracts the artifact, and does a direct (e.g., HTTP/SOAP) request back to the online music store to retrieve the user's current online music profile. The video store attempts retrieval of the assertion based on the artifact and, if necessary, uses the technique shown in FIG. 12 (and as described in U.S. Publication Nos. 20080010288) to do so. After obtaining the information it needs to validate the user, the video is provided.

Figure 13:
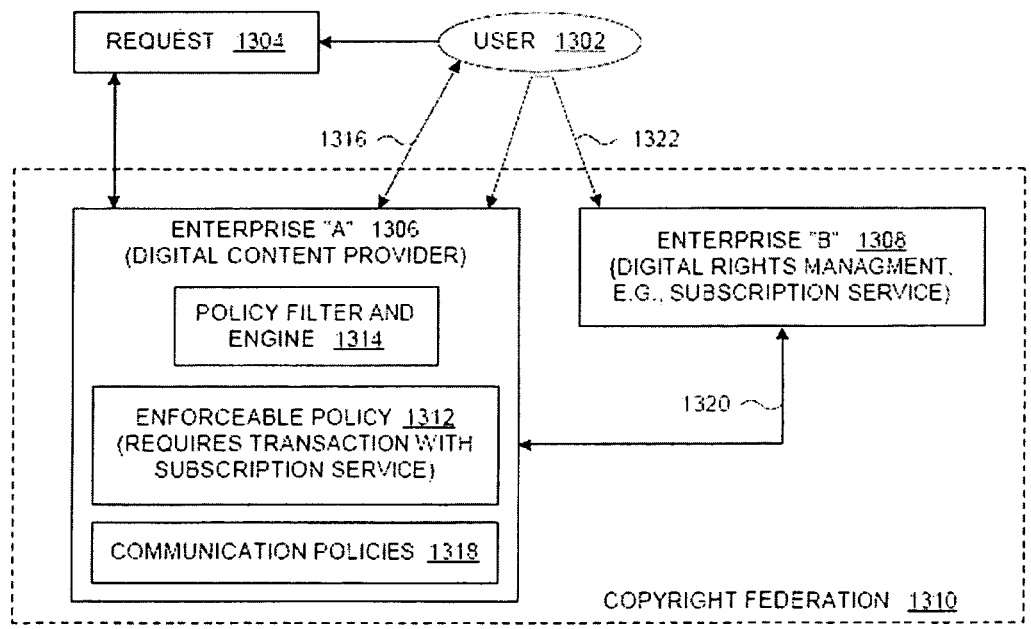
FIG. 13 shows another exemplary digital rights management scenario.

With reference now to FIG. 13, a block diagram depicts a further example of an exemplary digital rights management scenario. User/client 1302 initiates a transaction that sends request 1304 to enterprise "A" 1306, which is a digital content provider. Enterprise "B" 1308 is a digital rights management entity, such as a subscription service for managing subscription fees or other copyright restrictions with respect to copyright agreements between partners within federation 1310. A system administrator can set up DRM policy 1312 to be enforced by policy filter/engine 1314. When a user within the federation attempts a federation protocol operation/profile, e.g., a request to retrieve copyrighted content as represented by request 1304, the policy engine will be invoked, and policy 1312 will be found to be enforceable at that time. Policy 1312 may require that the user has a currently valid subscription before the user is allowed to complete a retrieval transaction with respect to copyrighted content.

Although enterprise 1306 does not manage the subscription, enterprise 1306 may have previously obtained information about the expiration time or date for the user's subscription from enterprise 1308 during a previous transaction. During the previous transaction, enterprise 1308 may have stored an expiration time as a user attribute. Hence, the user attributes of user 1302 can be used by enterprise 1306 to determine whether or not the user has a valid subscription within the federation for receiving the copyrighted content. If the expiration time of the user's subscription has not been stored during a previous transaction, or if the subscription status needs to be verified for some other reason, then the processing of request 1304 may require a single sign-on operation with enterprise 1308, which responds with a definitive status of the user's subscription, thereby allowing enterprise 1306 to determine whether or not to allow the user to retrieve the requested content.

Depending upon the current status of the user's subscription, additional protocol operations and/or communication interactions 1316 with the user may be required before request 1304 can be completed, as required by the enforcement of communication policies 1318. For example, a user may be required to consent to a communication/transaction between enterprise 1306 and enterprise 1308 prior to the communication. Alternatively, a user may be required to consent to the release of information from enterprise 1308 to enterprise 1306, e.g., to the release of information about the status of the user's subscription. In another alternative embodiment, enterprise 1306 may be required to obtain other information from the user, such as the identity of a different subscription service other than enterprise 1308 with which the user may have a valid subscription account.

These various additional communication requirements may be contained within communication policies 1318 that delineate the manner in which these communications are to be performed. For example, communication 1320 between enterprise 1306 and enterprise 1308 may be performed using a direct communication as federation partners, i.e. a backchannel communication that is independent of the user. Alternatively, communication 1322 between enterprise 1306 and enterprise 1308 may be performed using an indirect communication as federation partners, i.e. a front-channel communication via the user's client.

More generally, the subject matter described herein can take the form of an entirely hardware embodiment, an entirely software embodiment or an embodiment containing both hardware and software elements. In a preferred embodiment, the invention (comprising the client side functionality, the server side functionality, or both) is implemented in software, which includes but is not limited to firmware, resident software, microcode, and the like. Furthermore, as noted above, the invention can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

One or more of the above-described functions may also be implemented as a service in a hosted manner.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

I claim:

1. A method for enforcing a digital rights management (DRM) scheme associated with a piece of content, wherein an identity provider entity together with a service provider entity participate in a federation, comprising:
   at an identity provider entity that includes a hardware element:
      upon authentication of the end user to the identity provider entity, receiving a request to single sign-on to the service provider entity to attempt to obtain the piece of content;
      during processing of the request to single sign-on to the service provider entity, determining a DRM policy that is enforced at the service provider entity, determining a set of one or more DRM privileges associated with the end user requesting access to the piece of content, and based on the DRM policy and the set of one or more DRM privileges so determined, evaluating against the DRM policy the set of one or more DRM privileges, wherein the evaluating step is carried out using the hardware element;
      during processing of the request to single sign-on to the service provider entity, based on the authentication of the end user and a result of the evaluation, generating a single sign-on message that includes a reference to the set of one or more DRM privileges associated with the end user requesting access to the piece of content, wherein the single sign-on message is generated using the hardware element; and
      forwarding to the service provider entity the single sign-on message that includes the reference to the set of one or more DRM privileges to complete the processing of the request to single sign-on to the service provider entity, wherein the single sign-on message is forwarded from the identity provider entity to the service provider entity via a redirection mechanism;
      wherein evaluating DRM policy based on the determined DRM privileges during the single sign-on request processing flow provides an improved identity provider entity.

2. The method as described in claim 1 wherein the DRM policy is available locally at the identity provider entity.

3. The method as described in claim 1 wherein, when the DRM policy is not available locally at the identity provider entity, the method further includes the steps of:
   generating a DRM policy evaluation request that includes the set of one or more DRM privileges;
   forwarding the DRM policy evaluation request to an entity in the federation; and
   receiving a response to the DRM policy evaluation request.

4. The method as described in claim 3 wherein the response to DRM policy evaluation request indicates that access to the given piece of content is permitted.

5. The method as described in claim 1 wherein the set of one or more DRM privileges are available locally at the identity provider entity.

6. The method as described in claim 1 wherein, when the set of one or more DRM privileges are not available locally at the identity provider entity, the method further includes obtaining the set of one or more DRM privileges from an entity in the federation.

7. The method as described in claim 1 wherein, when the set of one or more DRM privileges are not available locally at the identity provider entity, the method further includes obtaining the set of one or more DRM privileges from the user.

8. The method as described in claim 7 wherein the set of one of more DRM privileges are obtained from the user directly.

9. The method as described in claim 7 wherein the set of one or more DRM privileges are obtained by having user cause a third entity to provide the set of one or more DRM privileges to the identity provider.

10. The method as described in claim 1 further including:
    receiving the set of one or more DRM privileges from a third entity in the federation;
    generating a DRM policy evaluation request that includes the set of one or more DRM privileges;
    forwarding the DRM policy evaluation request to a fourth entity in the federation; and
    receiving a response to the DRM policy evaluation request from the fourth entity.

11. The method as described in claim 10 wherein the third entity provides a service of managing the set of one or more DRM privileges on behalf of users within the federation.

12. The method as described in claim 10 wherein the fourth entity provides a service of managing DRM policy within the federation.

13. The method as described in claim 10 wherein the third and fourth entity are a single entity within the federation that manages the set of one or more DRM privileges on behalf of users and also manages DRM policy within the federation.

14. The method as described in claim 1 wherein the message includes a pointer to an assertion containing the set of one or more DRM privileges associated with the end user, and wherein the identity provider requests an exchange of the pointer for the assertion to obtain the set of one or more DRM privileges.

15. The method as described in claim 1 wherein the piece of content has an associated DRM license, distinct from the DRM privileges, the DRM license comprising a decryption key, a set of rights, and an identifier of a device associated with the end user and upon which the piece of content is permitted to be rendered.

* * * * *